United States Patent
Mathur et al.

(10) Patent No.: US 11,036,542 B2
(45) Date of Patent: Jun. 15, 2021

(54) AUTOMATICALLY LIMITING REPEATED CHECKING ON COMPLETION OF A COMMAND WITHOUT RELINQUISHING A PROCESSOR

(71) Applicant: Oracle International Corporation, Redwood Shores, CA (US)

(72) Inventors: Bhaskar Mathur, Bangalore (IN); Feroz Alam Khan, Bangalore (IN); Kant C. Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 16/052,473

(22) Filed: Aug. 1, 2018

(65) Prior Publication Data

US 2019/0102216 A1 Apr. 4, 2019

Related U.S. Application Data

(60) Provisional application No. 62/613,761, filed on Jan. 4, 2018, provisional application No. 62/565,097, filed on Sep. 29, 2017.

(51) Int. Cl.
*G06F 9/46* (2006.01)
*G06F 9/48* (2006.01)

(52) U.S. Cl.
CPC ............ *G06F 9/485* (2013.01); *G06F 9/4887* (2013.01)

(58) Field of Classification Search
CPC ........ G06F 9/485; G06F 9/4887; G06F 9/542; G06F 1/3228; G06F 13/22; G06F 11/3466

See application file for complete search history.

(56) References Cited

U.S. PATENT DOCUMENTS

| 5,566,351 A | 10/1996 | Crittenden et al. |
| 5,860,137 A * | 1/1999 | Raz .................. G06F 9/5083 707/E17.032 |

(Continued)

FOREIGN PATENT DOCUMENTS

WO 2016209268 A1 12/2016

OTHER PUBLICATIONS

Langendoen, Koen et al, "Integrating Polling, Interrupts, and Thread Management" believed to be published prior to May 19, 2017, downloaded from http://citeseerx.ist.psu.edu/viewdoc/download?doi=10.1.1.38.6855&rep=rep1&type=pdf.

(Continued)

*Primary Examiner* — Emerson C Puente
*Assistant Examiner* — Zhi Chen
(74) *Attorney, Agent, or Firm* — Omkar K. Suryadevara; Silicon Valley Patent Group LLP

(57) ABSTRACT

A process or thread is implemented to issue a command which executes without use of a processor that issues the command, retain control of the processor to check whether the issued command has completed, and when the issued command has not completed repeat the checking without relinquishing the processor, until a limiting condition is satisfied. The limiting condition may be determined specifically for a current execution of the command, based on one or more factors, such as durations of executions of the command after start of the process or thread and/or an indicator of delay in a current execution of the command. When the limiting condition is satisfied, the processor is relinquished by the process or thread issuing a sleep command, after setting an interrupt. After the command completes, the limiting condition is determined anew based on the duration of the current execution, for use in a next execution.

23 Claims, 19 Drawing Sheets

(56) References Cited

U.S. PATENT DOCUMENTS

| | | | |
|---|---|---|---|
| 6,453,268 B1* | 9/2002 | Carney | G06F 3/121 |
| | | | 702/186 |
| 6,848,005 B1 | 1/2005 | Plevyak et al. | |
| 8,392,923 B2 | 3/2013 | Walters | |
| 8,640,140 B2 | 1/2014 | Waddington et al. | |
| 8,724,612 B2 | 5/2014 | Al-Khudairi | |
| 9,215,188 B2 | 12/2015 | Masputra et al. | |
| 9,858,118 B2* | 1/2018 | Murata | G06F 9/542 |
| 2003/0078826 A1* | 4/2003 | Swanke | G06Q 10/063118 |
| | | | 705/7.15 |
| 2005/0268001 A1* | 12/2005 | Kimelman | G06F 13/24 |
| | | | 710/15 |
| 2007/0127322 A1* | 6/2007 | Anna | G11B 15/688 |
| | | | 369/30.38 |
| 2007/0220211 A1* | 9/2007 | Johns | G06F 8/458 |
| | | | 711/152 |
| 2013/0244686 A1* | 9/2013 | Saha | G01S 19/34 |
| | | | 455/456.1 |
| 2017/0199681 A1* | 7/2017 | Jain | G06F 3/0653 |

OTHER PUBLICATIONS

Corbet, Jonathan et al., "Blocking I/O", Linux Device Drivers, Chapter 6, Section 2, believed to be published Feb. 2005, pp. 14.
Unknown, Sleep (system call), Wikipedia, believed to be published prior to Feb. 10, 2017, downloaded from https://en.wikipedia.org/w/index.php?title=Sleep_(system_call).

* cited by examiner

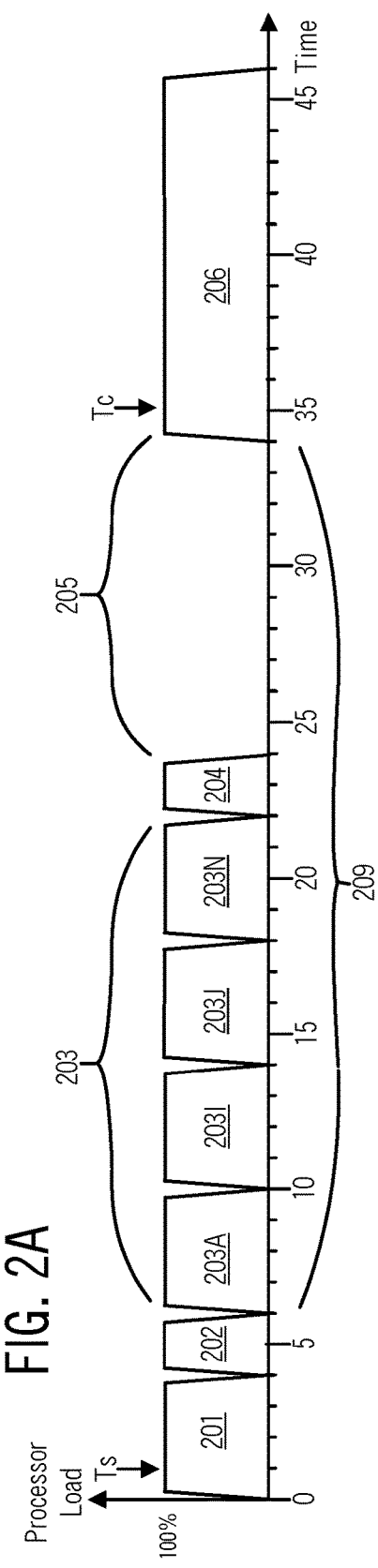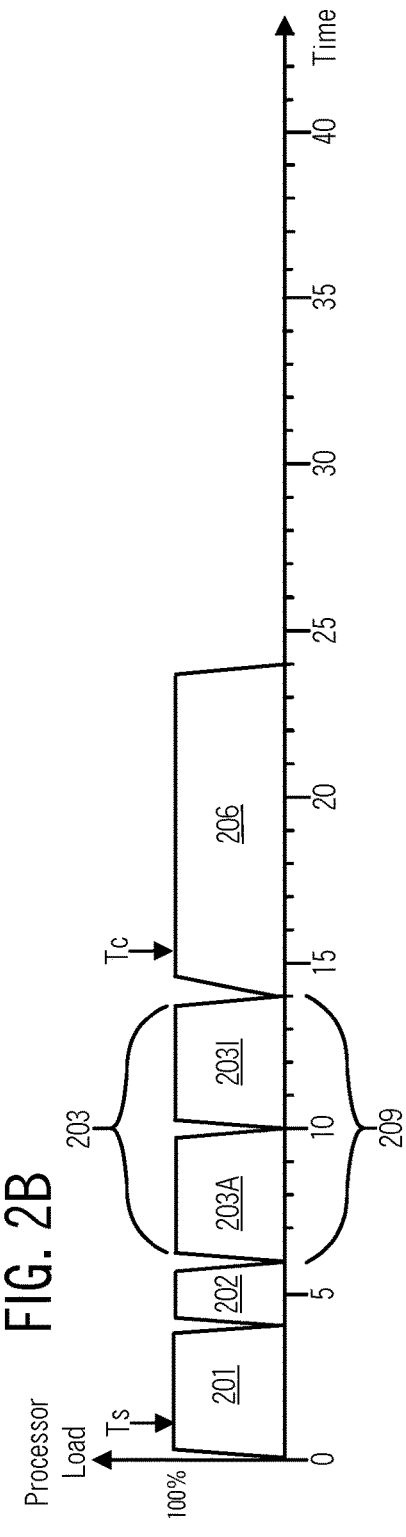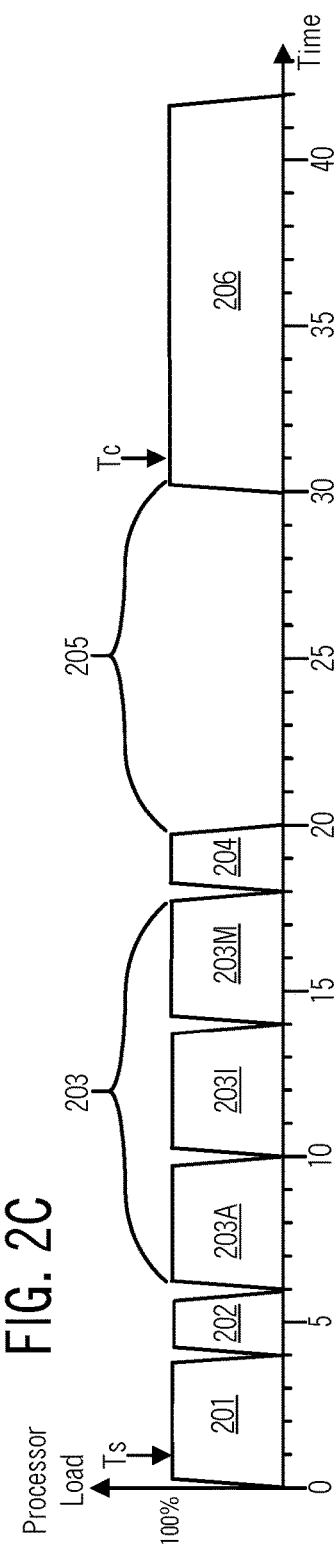

FIG. 5A
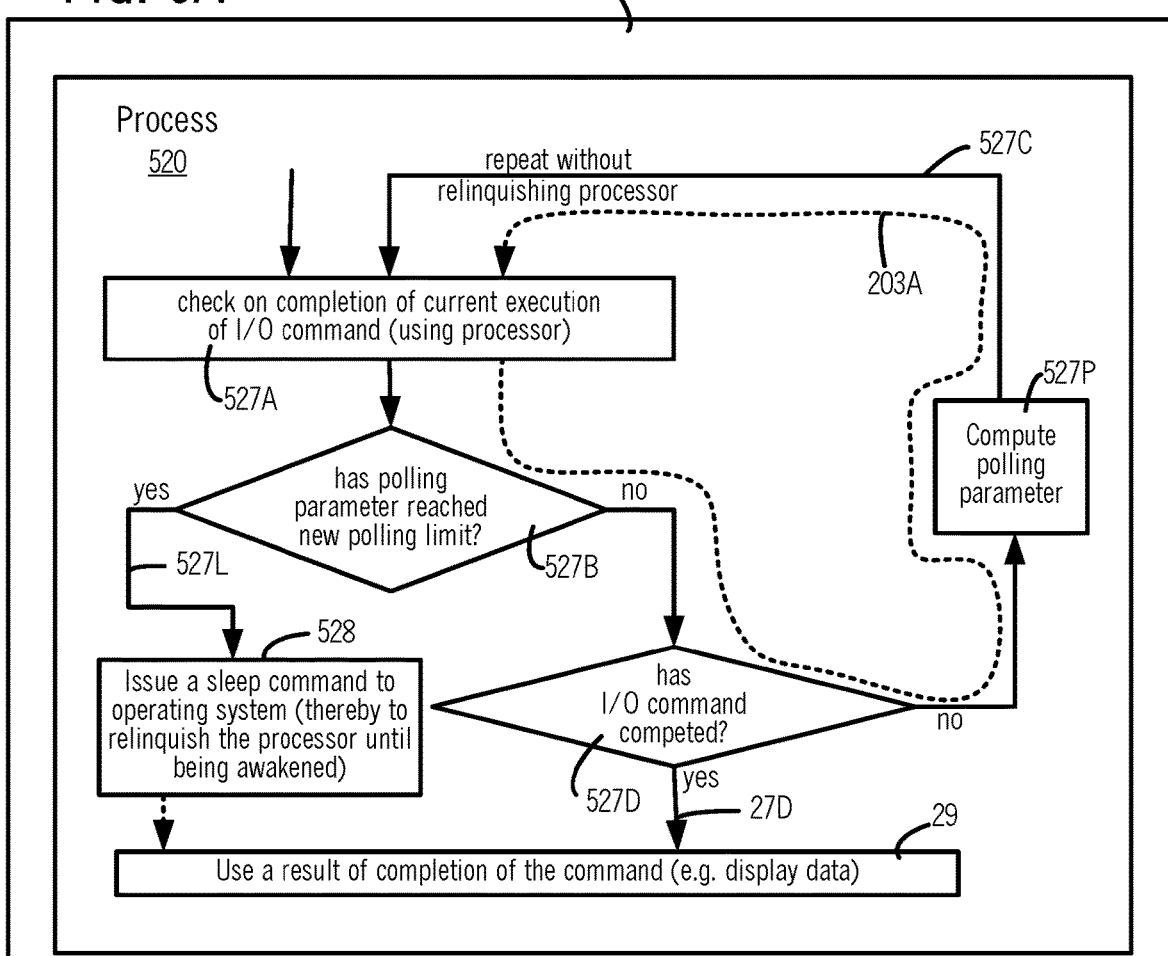
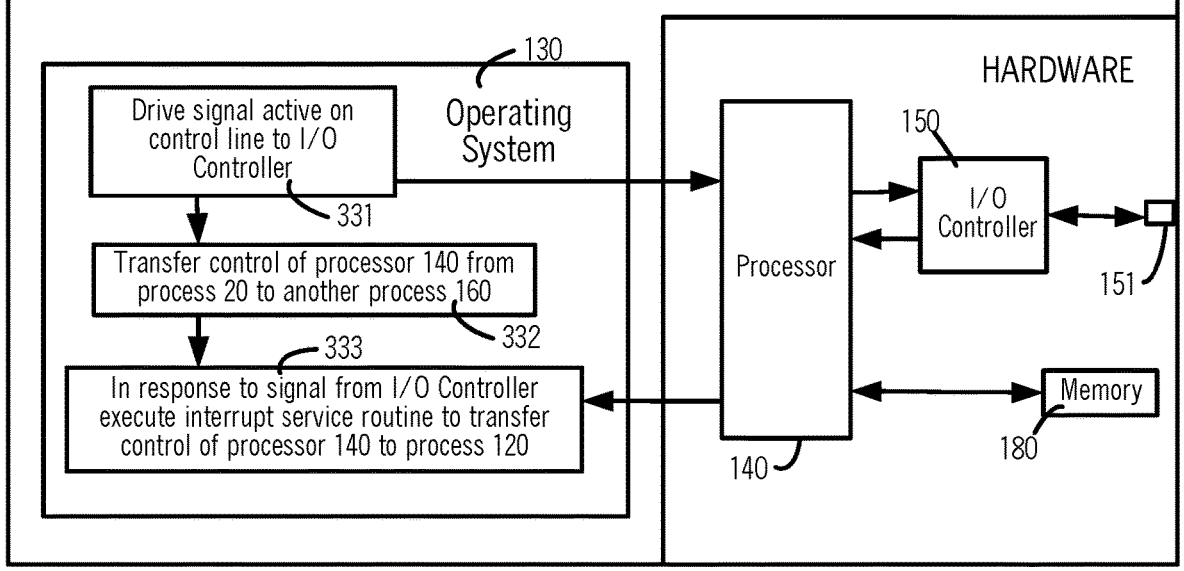

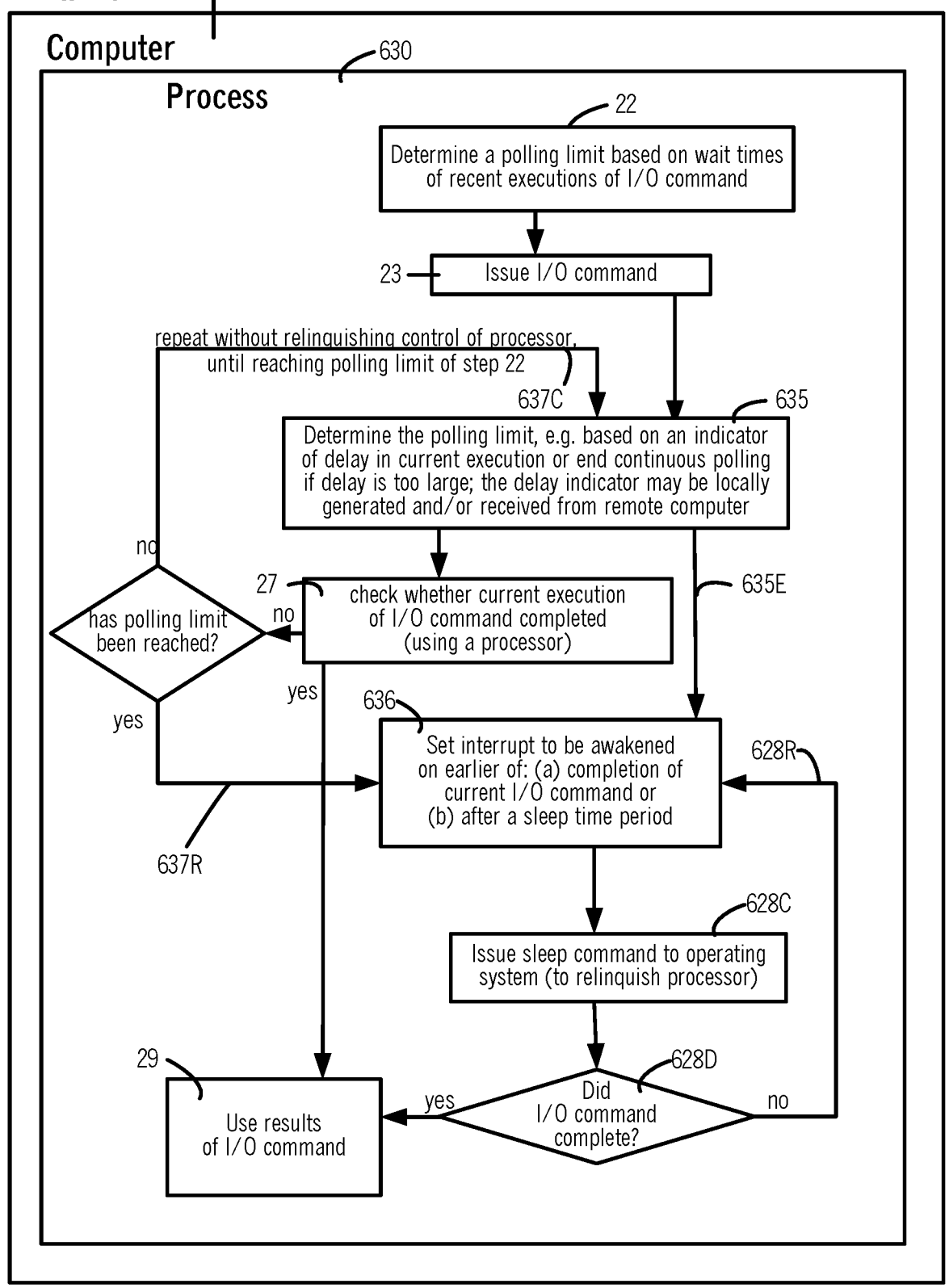

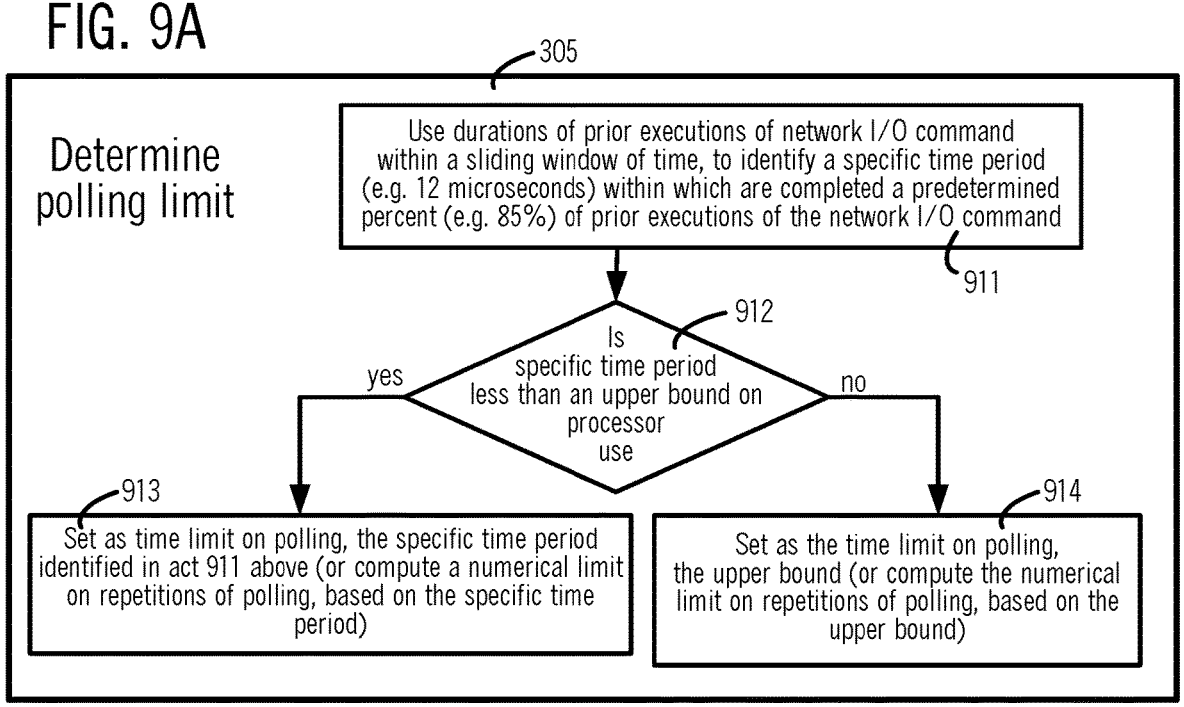
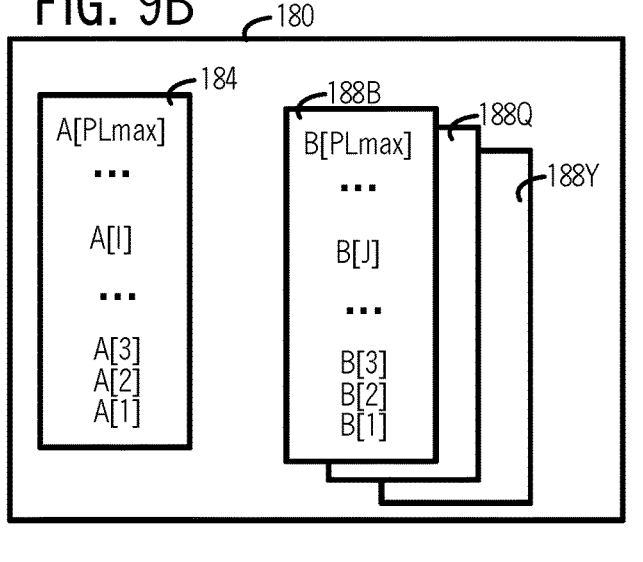
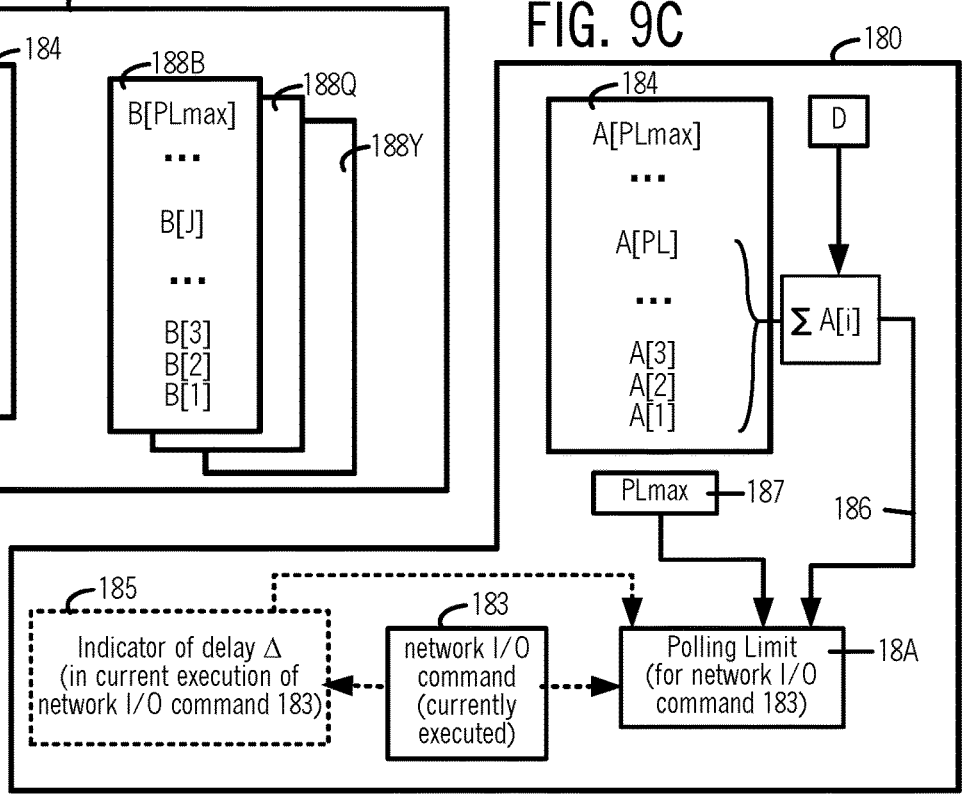

AUTOMATICALLY LIMITING REPEATED CHECKING ON COMPLETION OF A COMMAND WITHOUT RELINQUISHING A PROCESSOR

CROSS-REFERENCE TO PROVISIONAL APPLICATIONS

This patent application claims priority under 35 USC § 119 from U.S. Provisional Application 62/613,761 filed on Jan. 4, 2018, by Bhaskar Mathur, Feroz Alam Khan, and Kant C. Patel, entitled "Automatically Limiting Repeated Checking On Completion Of A Command Without Relinquishing Δ Processor", which is hereby incorporated by reference herein in its entirety.

This patent application additionally claims priority under 35 USC § 119 from U.S. Provisional Application 62/565,097 filed on Sep. 29, 2017, by Bhaskar Mathur, Feroz Alam Khan, and Kant C. Patel, entitled "Automatically Limiting Repeated Checking On Completion Of Δ Network Command Without Relinquishing Δ Processor", which is hereby incorporated by reference herein in its entirety.

BACKGROUND

In some computers, sets of software instructions that can be executed at least partially independent of one another are scheduled by an operating system to use a processor in a time-shared manner. Specifically, a particular sequence of execution (which may be a thread of a process, or a process that has no threads) of a series of instructions (also called "computer program"), receives control of a processor for a period of time allocated thereto ("time slice"). When the time slice ends, the processor is allocated by a scheduler in the operating system to another sequence of execution, which may be (1) another thread of the same process or (2) another thread of another process, or (3) another process, and which is selected from a queue ("runnable queue") of sequences of execution, which are currently awaiting execution, thereby to implement time sharing of the processor.

Any process or thread that is currently being executed by a processor ("running process" or "running thread") may relinquish control of the processor during its time slice, by making a sleep( ) system call to the operating system. A running process (or running thread) which goes to sleep via the sleep( ) system call, is thereafter awakened by the scheduler, after passage of an amount of time specified in an argument of the sleep( ) system call. Specifically, when the specified amount of time passes, the scheduler adds into the runnable queue, as a newly runnable process (or thread), a sleeping process (or thread) that is currently in a "not-runnable" queue, into which it was placed for the specified amount of time. This newly runnable process (or thread) receives control of the processor whenever its turn arrives (based on its position in the runnable queue). Due to delays inherent in context switching, there is no guarantee that this newly runnable process (or thread) will receive control of the processor immediately after the specified amount of time.

When a running process (or thread) issues an I/O command to be executed in I/O circuitry, the process or thread may retain control of the processor immediately after the I/O command's issuance and continue to use the processor, to check on completion of execution of the I/O command. In this first technique, the running process or thread waits for completion of the I/O command, by staying in running state, and repeatedly and continuously checks on whether the I/O command has completed. But a drawback of this first technique is that a processor, which is used to issue the I/O command, is used continuously by the running process or thread, and hence the processor is unavailable for use by other processes or threads (which are waiting in the runnable queue), for whatever amount of time the running process or thread is repeatedly polling. This inefficiency is addressed by a second technique, in which a running process or thread is put into the not-runnable queue on issuance of the I/O command, and awakened only after completion of the I/O command. A disadvantage of the second technique is that a process (or thread) that waits in the not-runnable queue may not receive control of the processor until after a considerable amount of time passes from the time at which the I/O command completes, due to delays inherent in context switching. In a third technique, a process (or thread) is programmed to minimize disadvantages of both techniques, by polling repeatedly and continuously for only a fixed period of time, and if the I/O command does not complete within the fixed time period then the process (or thread) sets an interrupt, issues the sleep( ) system call to the operating system, and is subsequently transferred to the runnable queue in response to occurrence of the interrupt. In the third technique, the fixed period of time, in which polling is performed repeatedly and continuously, is picked manually based on past experience (e.g., based on human experience of average time needed in the past, for such I/O commands to complete). This manually-picked time period is initialized as a constant before start of the process or thread, remains permanently unchanged until the running process or thread ends, and is used to stop repeated polling (e.g. to check on completion of all I/O commands).

SUMMARY

In several embodiments, a thread, or a process which has no threads, is implemented to use a processor in a computer to issue a command to be executed without use of the processor, and retain control of the processor immediately after issuance of the command. A limit, to be used to stop repetitive checking (e.g. continuous polling) on whether the command has completed, is determined in such embodiments, after the thread or process starts running (i.e. during a lifetime of the process or thread). After the command is issued, the processor is used to check on whether the command has completed, and while the command has not completed, without relinquishing the processor, the check is repeatedly performed until a limit is reached. In response to the limit being reached, the process or thread relinquishes the processor. In checking, when the command is found to have completed, the process or thread performs one or more operations normally performed on completion of the command, by using a result of the command's execution, e.g. to display data retrieved from storage.

In some embodiments, after processor relinquishment, whenever a new time slice is allocated, the process or thread is awakened and checks on the command's completion. In certain embodiments, the checking after being awakened is performed just once, followed by processor relinquishment again, if the command has not completed. In other embodiments, after being awakened following processor relinquishment, the checking is performed repeatedly until the limit (which was used to stop the repetitive checking before processor relinquishment) is again reached, followed by processor relinquishment again, if the command has still not completed. In variants of the just-described other embodiments, after being awakened following processor relinquishment, the limit is newly determined again, and this newly-determined limit is used to stop new repetitive checking performed in the new time slice (which was just allocated as noted above, on being awakened following processor relinquishment).

Determination of a limit automatically as described above, enables stoppage of repetitive checking to be made programmatically responsive to changes in computing load and/or I/O latencies that may arise during a lifetime of the process or thread, e.g. immediately before and/or immediately after issuance of the command, depending on the embodiment. In some embodiments, determination of the limit is done in a loop in which the command is issued, so the limit is updated at least once on each iteration, thereby making the limit responsive to recent changes in load and/or latencies that may occur just before or even after the command is issued. In certain embodiments, determination of the limit is done in each iteration of repetitive checking for completion of the command, thereby making the limit responsive to current changes in load and/or latencies that may occur after repetitive checking starts, even between one or more iterations thereof. In illustrative embodiments, a duration for which repetitive checking on command completion is performed without processor relinquishment (also called "busy polling") is determined based on times taken recently for the command to complete execution and/or based on an indicator which identifies a delay in completion (or on-time status, or in some examples even early completion) of the command's current execution (e.g. received from an I/O controller coupled to a remote storage and/or a directly attached storage).

In several embodiments, after using a processor to issue a command to be executed external to the processor (also called "processor-external" command), a process or thread retains control of the processor and performs busy polling so that all cycles of the processor continue to be used without break, exclusively in performing iterations of the busy polling, until either the processor-external command completes execution or the limit is reached. Depending on the embodiment, when the above-described limit (also called "polling limit") is reached, the thread or process may issue a sleep command to relinquish the processor, followed by being awakened eventually in a normal manner e.g. in response to completion of execution ("current execution") of the processor-external command.

In many embodiments, a processor-external command of the type described above is used to input data to or output data from (also called "data input-output" or simply I/O), a specific storage. In several such embodiments, before issuance of the processor-external command, a process or thread sets up a specific connection between a computer ("local computer") in which the process or thread executes, and the specific storage, e.g. via an I/O controller. Depending on the embodiment, the specific storage may be a network attached storage (NAS), a device in a storage area network (SAN), or a directly attached storage (DAS). Thereafter, in this specific connection, during a first phase (also called "Phase S"), the above-described processor-external command is repeatedly issued to input and/or output data (also called "I/O command"), and corresponding times taken by the I/O command to complete execution (also called "wait times") are stored in memory, e.g. stored by the process or thread, or alternatively stored by the I/O controller. Subsequently, in a second phase (also called "Phase D"), the thread or process identifies wait times of executions of the I/O command that completed recently ("recent wait times"), e.g. by use of a window of fixed size (fixed in duration or fixed in number of executions) which is moved forward at least on each issuance of the I/O command. The recent wait times of respective executions of the I/O command ("recent executions") are retrieved from memory by a thread or process of some embodiments, and used to ascertain a duration, such that at least a fixed percent (e.g. 80%) of the recent executions complete within the duration. A probability of completion of a current execution of the I/O command within this duration, may be expected in such embodiments, to approximate (e.g. be within 10% of) the just-described fixed percent (e.g. completion probability of the I/O command, within this duration, is expected to be around 80%).

In some embodiments, a thread or process determines a new limit based on an indicator of current status, which may be internal to the local computer and/or received in the local computer from a remote computer. Specifically, in several embodiments, an indicator of current status is used to increase, decrease, or retain unchanged, a duration ascertained as described above, based on an indicator from an I/O controller which identifies a delay in completion, or early completion, or on-time status of completion of an I/O command's current execution. In such embodiments, one or more indicators of delay in completion or early completion or on-time status may be used, to partially or fully determine a new limit or adjust a newly-determined limit, during a current execution of a processor-external command. The indicators may additionally or alternatively identify circumstances that affect completion of the I/O command, such as a status in the local computer (e.g. processor load or memory usage), and/or status received from a source external to the local computer, such as a remote computer to/from which data is transferred on execution of the processor-external command (e.g. if the processor-external command is a network input-output command). Thus, a polling limit of the type described above may be determined partially or fully based on e.g. (a) responsiveness of a remote computer used as a source of data on which the command is executed, and/or (b) latency of a network between a local computer in which the process or thread is running and the remote computer and/or (c) processor load in the local computer.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 2A-2C illustrate, in timing diagrams, use of a processor 140 of computer 110, by process 20 illustrated in FIGS. 1A and 1B.

FIG. 5A illustrates, in an intermediate-level flow chart, steps 331-333 performed by an operating system in certain embodiments, and further illustrates steps 527A, 527B, 527D, 527P used to implement repeated polling in process 520 in some embodiments.

FIG. 6B illustrates, in a high-level flow charts, steps of process 630 including polling limit determination, and changes to a polling limit within a loop of repeated polling in process 630 in some embodiments.

FIG. 9A illustrates, in an intermediate-level flow chart, acts 911-914 that are implemented similar to step 305 of FIG. 3A in some embodiments of process 320.

FIGS. 9B and 9C illustrate array 184 and storage locations 183, 185, 187 and 18A in memory 180 prepared and/or used by acts 911-914 of FIG. 9A.

DETAILED DESCRIPTION

Figure 1A:
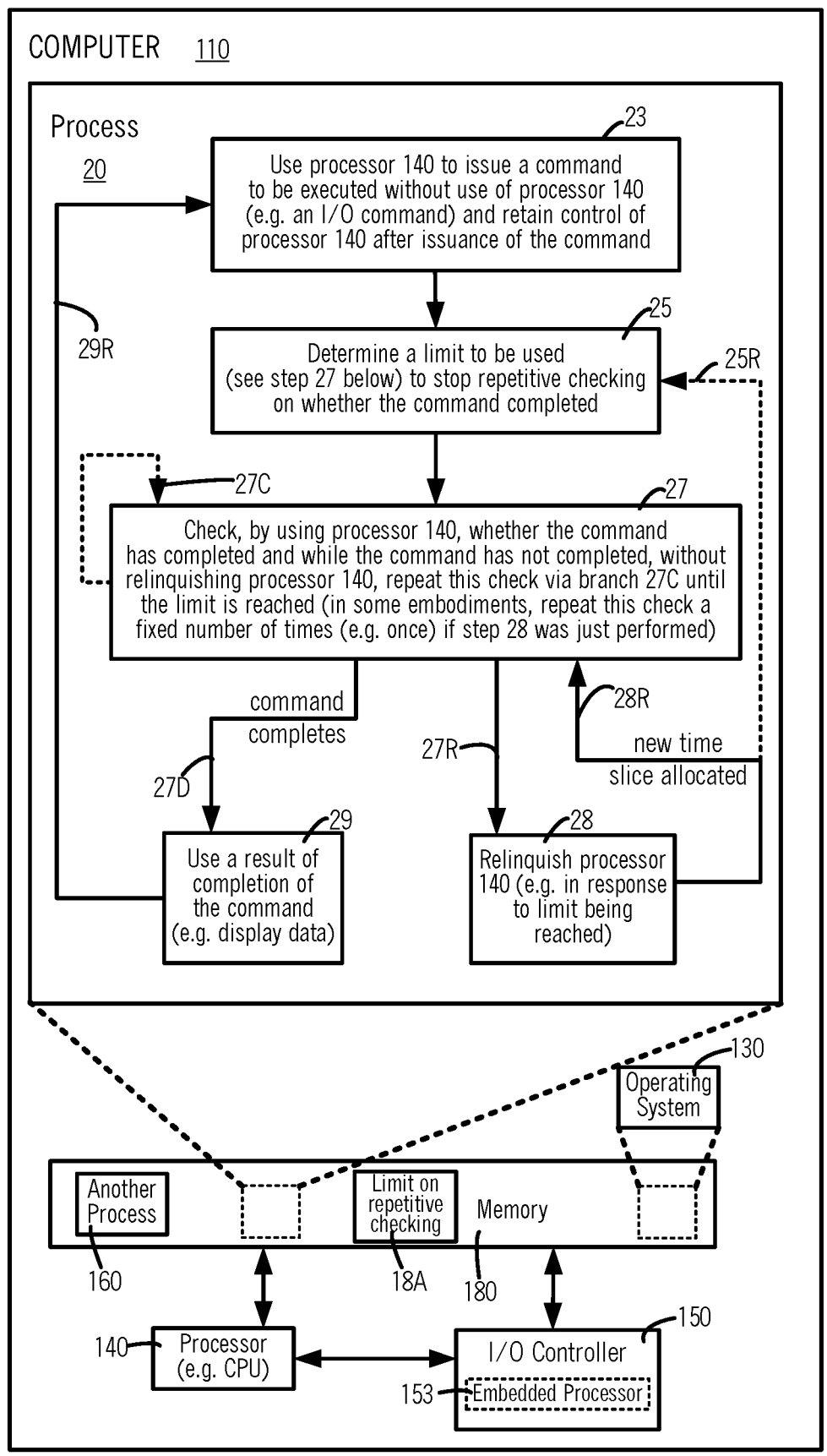
FIGS. 1A and 1B illustrate different embodiments of a process 20 in computer 110, wherein a polling limit 18A is determined before or after a step 23 in which processor 140 is used to issue a command to be executed external to processor 140.
Figure 1B:
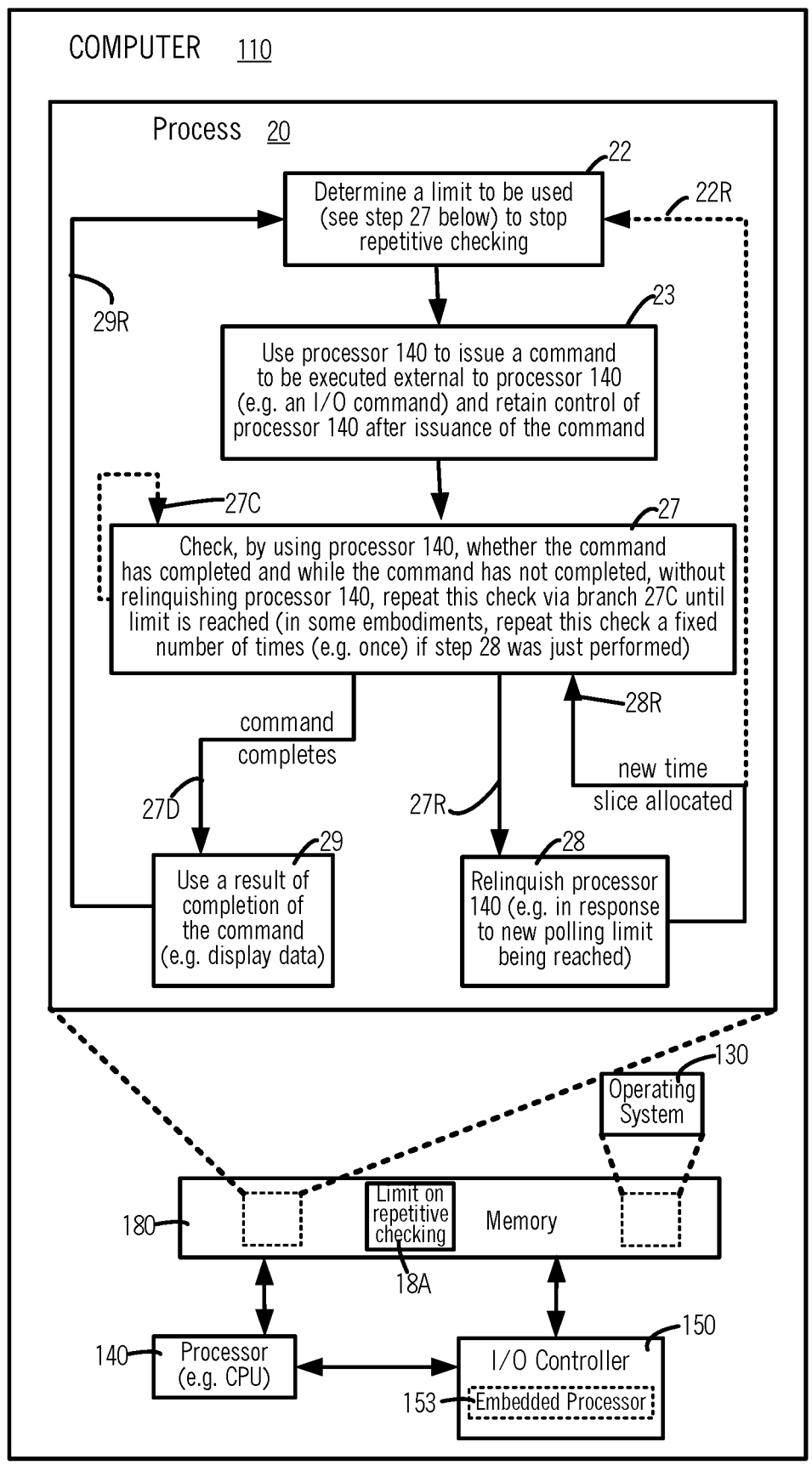
Figure 3A:
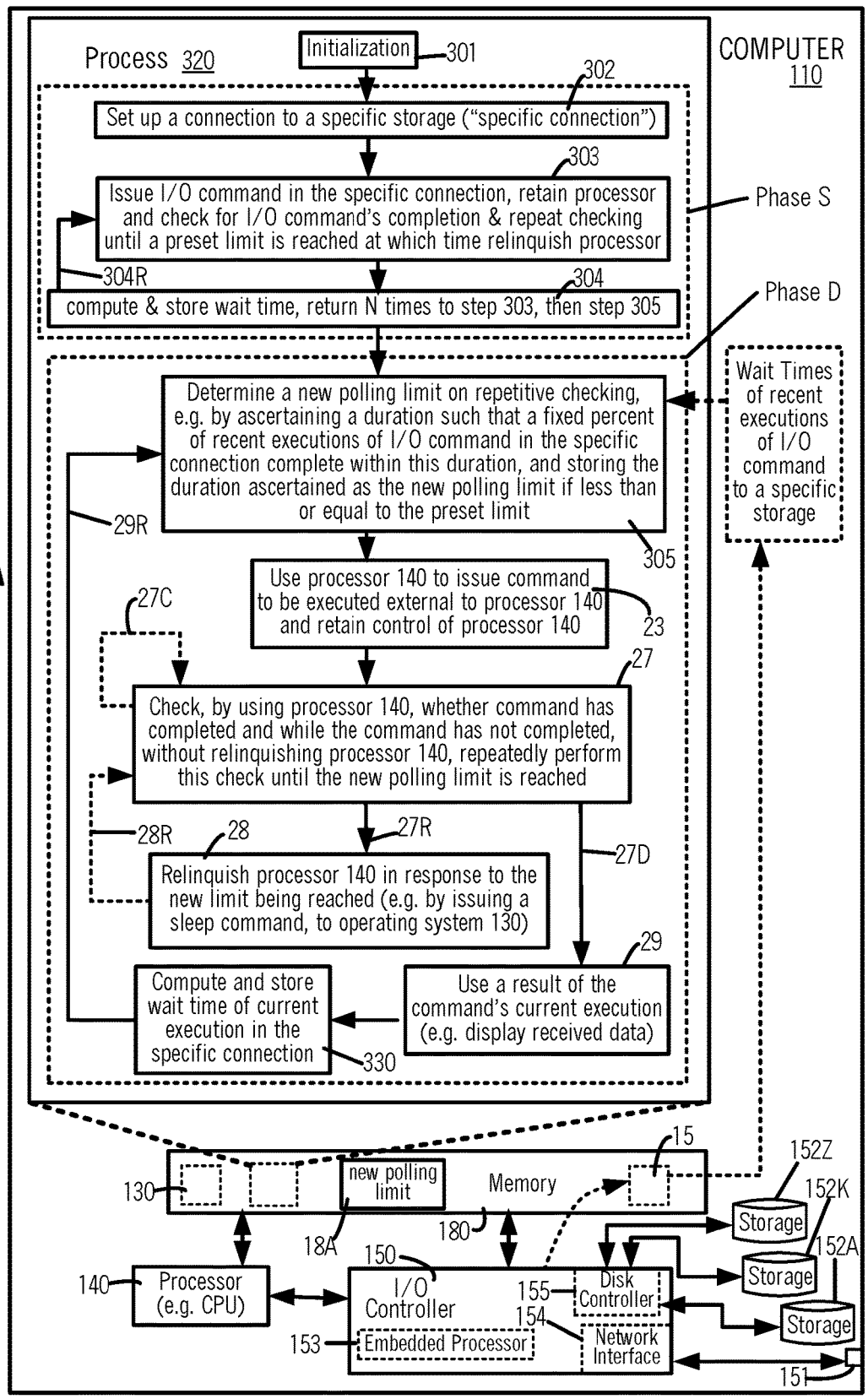
FIG. 3A illustrates another embodiment of a process 20 in computer 110, wherein the command issued is an I/O command to a specific storage, and polling limit 18A is determined based on times taken by recent executions of the I/O command to complete ("wait times").

In several embodiments of the type shown in FIGS. 1A, 1B and 3A, a sequence 20 of steps executed in computer ("local computer") 110 by a processor 140 may be implemented as a process which has no threads, or alternatively sequence 20 may be implemented as a thread of a process (not shown). Hence, although the following description refers to sequence 20 as a process, it is to be understood that the same description applies to a thread, unless stated otherwise.

Processor 140 is used to execute a sequence of instructions of process 20, e.g. as a central processing unit (CPU). Depending on the embodiment, instead of processor 140, any of one or more additional processors 141-143 in computer 110 (FIG. 10) may execute the sequence of instructions of process 20. In some embodiments, process 20 is configured to perform a step 23 (FIGS. 1A, 1B), to use a processor 140 to issue a command to be executed external to processor 140 and retain control of processor 140 immediately after issuance of the command. The command issued in step 23 (FIGS. 1A, 1B) is also called "processor-external" command, and it may be executed in, for example, an embedded processor 153 in I/O controller 150 which is external to processor 140.

After step 23 (FIGS. 1A, 1B, 3A), processor 140 may be used in any subsequent step of process 20, such as step 25 (FIG. 1A) to determine a polling limit 18A, and/or step 27 (FIGS. 1B, 3A) to repeatedly check whether the command has completed. Thus, after the processor-external command is issued in step 23, processor 140 continues to be used by process 20 at least in step 27 (FIGS. 1A, 1B and 3A), to check on whether the command has completed. In step 27 (FIGS. 1A, 1B and 3A), while the processor-external command has not completed, without relinquishing processor 140, the check is performed repeatedly until polling limit 18A is reached. Specifically, checking in step 27 is performed without relinquishing processor 140 between iterations of repeatedly checking (on whether the command has completed), until the polling is stopped either because polling limit 18A has been reached, or due to completion of the processor-external command.

In many embodiments, polling limit 18A newly determined in step 25 (also called "new polling limit") is used in step 27 (FIGS. 1A, 1B and 3A) to stop repeatedly checking for completion of the processor-external command. New polling limit 18A is determined after process 20 starts running, and depending on the embodiment, it may be determined at any time relative to step 23 (FIGS. 1A, 1B and 3A), e.g. immediately before or immediately after step 23 or in an alternative embodiment (described below) simultaneously therewith (e.g. external to process 20, either in another process or in a service of operating system 130). Determination of new polling limit 18A automatically in step 25, enables stoppage of repetitive checking in step 27 to be made programmatically responsive to changes in computing load and/or I/O latencies that may arise during the lifetime of process 20, e.g. immediately before and/or immediately after issuance of the processor-external command, depending on the embodiment. In some, as illustrated by step 25 (FIG. 1A) and step 22 (FIGS. 1B and 3A), new polling limit 18A is determined within process 20, although in other embodiments new polling limit 18A may be determined by another process 160 (or by a service of the operating system 130).

Determination of new polling limit 18A (whether inside of process 20 or external to process 20) is performed in many embodiments after process 20 starts running (i.e. during the lifetime of process 20), and hence this determination is responsive to changes in load and/or latency that occur between an initial time at which process 20 starts running and a subsequent time at which the determination is made (e.g. in step 25 or step 22 shown in FIG. 1A or 1B respectively). Depending on the embodiment, determination of new polling limit 18A may be based at least partially on one or more statistics, such as amount of time taken for the command to complete execution after process 20 starts running, e.g. wait times recorded for the most-recent N executions of the command, or wait times recorded for executions of the command that complete in the most-recent ΔT time period relative to current time (at which new polling limit determination is being made).

Referring to step 27 in FIGS. 1A, 1B and 3A, in response to the new polling limit 18A being reached in step 27, process 20 takes branch 27R to step 28 wherein process 20 relinquishes processor 140 to operating system 130. After process 20 relinquishes processor 140, whenever a new time slice is allocated, process 20 takes branch 28R and returns to step 27, to check on completion of the processor-external command. In taking branch 28R to return to step 27 from step 28, certain embodiments of process 20 may be configured to determine a newer polling limit 18A, by performing step 25 again via branch 25R in FIG. 1A. Similarly, process 20 shown in FIG. 1B may return from step 28 to step 22 via branch 22R. In some embodiments, the checking in step 27 after being awakened is performed once, followed by processor relinquishment in step 28 via branch 27R if the command has not completed. In other embodiments, after being awakened, the checking in step 27 is performed repeatedly via branch 27C until a polling limit (or another such limit) is reached, followed by processor relinquishment in step 28 via branch 27R if the command has not completed.

In checking in step 27, when the command is found to have completed, process 20 takes branch 27D to step 29. In step 29, process 20 performs one or more operations normally performed on completion of the processor-external command, which typically include use of a result of completion of the command, e.g. display on a video monitor 1112 (FIG. 11A), any data retrieved from storage (e.g. if the processor-external command was an I/O command). In some embodiments, process 20 is configured to use branch 28R to go from step 28 to step 27 only a predetermined number of times, e.g. 2 times, and thereafter stay in step 28 indefinitely until awakened by an interrupt in response to completion of the command. In some embodiments of the type just described, process 20 may be configured to stay in step 28 for a predetermined amount of time, and thereafter abort waiting and return to step 23.

After step 29, process 20 goes via branch 29R to step 23 (FIG. 1A) or step 22 (FIG. 1B), thereby to repeat the above described steps 23, 25 and 27-29 (FIG. 1A) or steps 22, 23 and 27-29 (FIG. 1B). In the just-described loop of control flow via branch 29R, process 20 determines polling limit 18A afresh in each iteration (and accordingly, also called "new polling limit", followed by "newer polling limit", followed by "newest polling limit" depending on the iteration, as described below), by performing step 25 (FIG. 1A) or step 22 (FIG. 1B), followed by use of new polling limit 18A in step 27 (FIGS. 1A, 1B). Specifically, on completion of step 29 in a first iteration, process 20 may use any processor allocated thereto (which may be processor 140, or any of processors 141-143 shown in FIG. 10), to transition via branch 29R to start a second iteration (FIGS. 1A, 1B and 3A).

In the second iteration, polling limit 18A is determined (also called "newer polling limit") by performing step 25 (FIG. 1A), step 22 (FIG. 1B) again, and this newer polling limit is used in performing step 27 again (FIGS. 1A, 1B). Thus, in the second iteration of step 27 (FIGS. 1A, 1B), process 20 uses said any processor, to repeatedly check on whether a newer execution (started in response to issuance of the command in step 23 of the second iteration) has completed. While the newer execution has not completed, without relinquishing said any processor in the second iteration, process 20 repeats checking in step 27 via branch 27C, until the newer polling limit is reached. In response to the newer polling limit being reached in step 27 of the second iteration, process 20 relinquishes said any processor. Therefore, determination of polling limit 18A (in step 22 of FIG. 1B or step 25 of FIG. 1A), repetitively in a loop via branch 29R (FIGS. 1A, 1B) enables the polling limit 18A to be determined freshly in each iteration, making the freshly-determined polling limit 18A responsive to changes in load and/or latencies that may arise even after looping via branch 29R starts.

Figure 4:
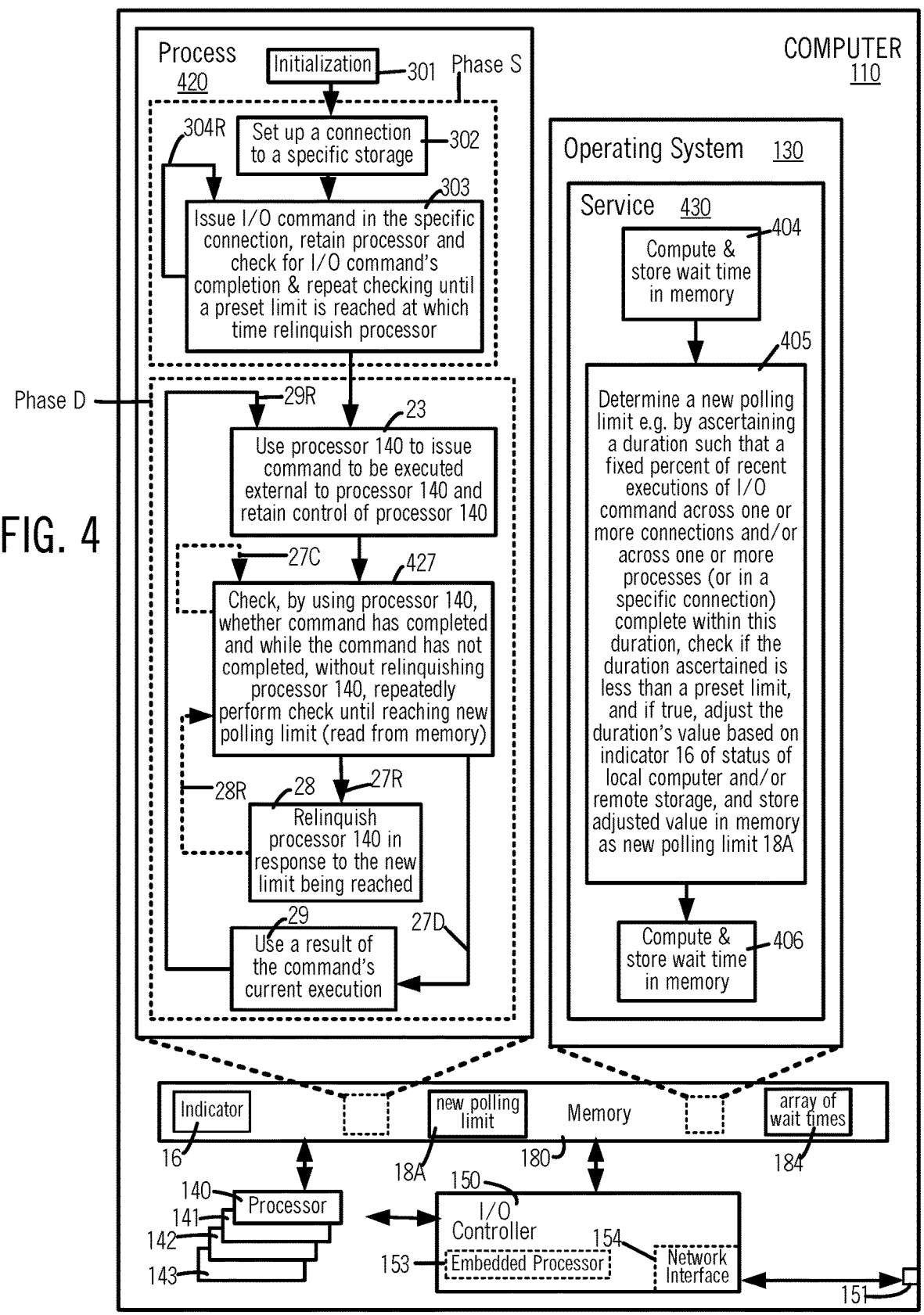
FIG. 4 illustrates certain embodiments of computer 110 wherein steps 304, 305 and 330 of process 320 (FIG. 3A) are performed similarly in service 430 (FIG. 4) of operating system 130 as respective similar steps 404, 405 and 406 that determine and store in memory 180, an array 184 of wait times and/or polling limit 18A, at locations accessible to process 420 (FIG. 4).

Although in some embodiments, polling limit 18A is determined freshly in each iteration as described in the preceding paragraph above, in other embodiments determination of polling limit 18A may be performed less often, e.g. on issuance of a command multiple times (e.g. 2 or more times), or even performed asynchronously relative to issuance of the command (e.g. as described below, see step 405 in FIG. 4).

Depending on the embodiment, repetitive checking via branch 27C (FIGS. 1A, 1B) may be performed by usage of processor 140 exclusively, or performed interspersed with usage of processor 140 within process 20 for other operations. Specifically, in some embodiments illustrated in FIGS. 2A-2C (described below), processor 140 is used by process 20 exclusively to perform the above-described repetitive checking continuously ("continuous polling"), so that all cycles of processor 140 are used without break, exclusively in performing iterations of continuous polling, until the processor-external command completes execution or the new polling limit is reached. In alternative embodiments of the type illustrated in FIG. 6B (described below) processor 140 is used for repetitive checking via branch 27C and additionally for other operations within a loop implemented by branch 27C, e.g. to change a freshly-determined polling limit 18A based on an indicator of current status external to processor 140 (e.g. based on an indicator from I/O controller 150).

Repeated checking via branch 27C without relinquishing processor 140 (also called "repeated polling") is disadvantageous in a first type of situations ("high-latency situations"), because processor 140 which is used in repeated polling is unavailable to other processes or threads in computer 110 (such as process 160), during the time taken by the processor-external command to complete. But if repeated polling is not performed in a second type of situations ("low-latency situations"), results of execution of certain types of processor-external commands may be available (and remain unprocessed) for an excessively large number of processor cycles, before process 20 which may have relinquished processor 140 (e.g. by issuing a sleeping command) is awakened, due to corresponding delays inherent in context switching. A third type of situations may range across the just-described two types of situations, for example, when a processor-external command's execution (1) frequently takes less time than the duration of a time slice allocated to process 20, in which case repeated polling is appropriate and (2) occasionally takes more time than the duration of the time slice, in which case it is appropriate to issue a sleep command to operating system 130 (with a request to be awakened on completion of the processor-external command).

Hence, the current inventors believe that processing of data in the third type of situations described in the preceding paragraph above can be improved, by configuring internal operations of a computer ("local computer") 110 (FIGS. 1A, 1B and 3A), to automatically stop repeated polling by process 20 (which issues the processor-external command), based on a new polling limit 18A determined in step 25 (FIGS. 1A, 1B and 3A) at least after process 20 starts running, e.g. after one or more issuances of the processor-external command (and in some embodiments, based on times taken for these issuances to complete execution). Computer 110 (FIGS. 1A, 1B and 3A) may be configured to impose, on repeated polling by a processor 140, for completion of a processor-external command that is currently executing in other circuitry, a limiting condition (e.g. including a polling limit 18A and a comparator used to stop the repeated polling) that is determined specifically for the command's current execution (e.g. based on one or more recent executions of the command, such as a most-recent execution and a next-to-most-recent execution, or most-recent N executions, or executions that complete in the most-recent ΔT time period relative to current time).

A limiting condition used in step 27 (FIGS. 1A, 1B and 3A) may be implemented, for example, as comparison of polling limit 18A expressed as a number to a count of how many times polling is repeated (or comparison of polling limit 18A expressed as a duration to how long the command has been executing). Polling limit 18A may be determined based on wait times of recent executions of the processor-external command, so that the limiting condition is expected to be satisfied by a predetermined percent of such executions. Thus, in some embodiments, the limiting condition is determined at least partially based on statistical data including metrics of recent executions, such as a largest time among wait times (which are amounts of time taken for completion) of a predetermined percentage of recent executions of the processor-external command. A set of recent executions used in the determination may be selected to be those executions of the processor-external command which complete in a sliding window of a fixed size (e.g. 1 minute in duration, or 1000 executions) which ends when a current execution of the processor-external command starts.

In certain embodiments, a set of recent wait times or a set of respective recent executions which are used in determining a new polling limit (e.g. by use of a sliding window) are of the same processor-external command, which may be issued with different arguments. A processor-external command's recent executions are programmatically identified in some embodiments of the thread or process, for inclusion in a corresponding sliding window, based on syntax of a grammar of a language in which the processor-external command is expressed and further based on names of functions in a software library installed in computer 100. Thus, recent wait times identified by a sliding window are of the same I/O command, even though an I/O command's issuance that starts a recent execution may identify one or more arguments (e.g. a file_offset, or a block_address) different from another recent execution. Other examples of arguments of an I/O command in some embodiments are as follows: address of remote computer 190, source memory address, number of bytes, key representing mappings of source memory, destination memory address, destination memory key and size.

Specifically, in some embodiments of the type described in the preceding paragraph above, recent wait times identified by use of the sliding window are such that each recent execution was started by issuance of the processor-external command identified by a specific name in the software library which is identical any other recent execution of the processor-external command. In an illustrative example, a software library provides support for a first processor-external command named file_read, a second processor-external command named file_write, a third processor-external command named block_read, and a fourth processor-external command named block_write. In illustrative embodiments based on the just-described example, a first sliding window is used to identify a first set of recent executions of the file_read command, a second sliding window is used to identify a second set of recent executions of the file_write command, a third sliding window is used to identify a third set of recent executions of the block_read command, and a fourth sliding window is used to identify a fourth set of recent executions of the block_write command.

Automatically limiting repeated polling as described herein (e.g. in reference to FIGS. 1A, 1B and 3A) based on a limiting condition that is determined automatically and specifically for one or more new executions of a processor-external command has an advantage of improving internal operations of computer 110, e.g. by early relinquishment of a processor 140 (based on the just-described limiting condition) in high-latency situations, so that processor 140 is allocated to another process or thread sooner than otherwise, which in turn results in more efficient use of processor 140 (relative to continued use of the same processor in repeated polling without relinquishment). Moreover, relinquishment of a processor 140 in low-latency situations is avoided when polling limit 18A is dynamically determined automatically as noted above, e.g. so that completion of execution of the command is not missed by premature issuance of a sleep command to the operating system 130. In some embodiments, polling limit 18A may be elongated or shortened, e.g. based on an indicator of delay in completion or early completion respectively.

One or more steps and/or acts and/or operation described herein may be applied in alternative embodiments to a process (or thread) which checks repeatedly on, for example, a semaphore. Moreover, although in the description of some embodiments, a new polling limit is automatically determined and used to limit repeated polling of a next execution of a processor-external command, in other embodiments a common polling limit is automatically determined and used to limit repeated polling of a predetermined number of new executions (e.g. 10 executions) of the processor-external command issued by the process (or thread). Furthermore, in some situations, repeated polling on completion of a processor-external command may be skipped in certain embodiments by a process (or thread) configured to issue a sleep command to the operating system immediately after issuance of the command, e.g. when a freshly-determined polling limit exceeds a preset upper bound thereon (see PLmax, described below).

FIGS. 2A-2C illustrate in timing diagrams, thee iterations respectively, in a loop of above described steps 23, 25 and 27-29 (FIG. 1A), as performed in certain embodiments. Note that the time axis (shown horizontal) in FIGS. 2A-2C identifies relative time, with the origin indicating start of step 23 by process 20 (FIGS. 1A, 1B) to issue a processor-external command, as described herein. In some illustrative embodiments, increments of time shown on the time axis of FIGS. 2A-2C denotes processor cycles, and each time increment may take, for example, 1 microsecond. Hence, time period 209 in FIG. 2A starts at 6 microseconds and ends at 34 microseconds, relative to start of performance of step 23 by process 20. Accordingly, in one iteration of process 20 illustrated in FIG. 2A, step 23 (FIG. 1A) issues a processor-external command in time period 201 (FIG. 2A) which may take, for example 4 processor cycles (or 4 microseconds of wall-clock time). Step 23 is followed by step 25 (FIG. 1A) which determines a new polling limit 18A being performed in time period 202 (FIG. 2A), which may take, for example, 2 cycles of processor time, or 2 microseconds.

Next, performance of a first check in step 27 (FIG. 1A) takes, for example, 4 cycles of processor time, or 4 microseconds, as illustrated by time period 203A (FIG. 2A). On completion of a check in step 27, if execution of the processor-external command has not completed, process 20 takes branch 27C (FIG. 1A) to repeat step 27 without relinquishing processor 140. Repetition of step 27 in the iteration shown in FIG. 2A is illustrated by time periods 203A-203N (which together constitute time period 203 of continuous polling). Therefore, in the iteration of FIG. 2A, process 20 uses processor 140 continuously in time period 203, exclusively for polling on completion of the processor-external command. At the end of time period 203N (FIG. 2A), process 20 finds that new polling limit 18A (determined in step 25 in time period 202) which is used to stop continuous polling has been reached, and hence process 20 no longer takes branch 27C to repeat the checking in step 27, and instead transitions via branch 27R to step 28 (FIG. 1A).

In the iteration shown in FIG. 2A, step 28 is performed in time period 204, and so process 20 relinquishes processor 140, e.g. by issuing a sleep command after setting one or more interrupts on which process 20 is to be awakened, and optionally specifying a timeout or sleep time period. Step 28 may take, for example, 2 cycles of processor time, or 2 microseconds, as illustrated by time period 204 (FIG. 2A). As noted above, on issuance of a sleep command, process 20 voluntarily relinquishes its control of processor 140 which may then be allocated by operating system 130 to any other process, such as process 160 (FIG. 1A). At this stage, operating system 130 adds process 20 to a data structure in memory 180 which may identify multiple such sleeping processes (e.g. in a not-runnable queue or list), and hence process 20 does not use processor 140 during a time period 205, as illustrated in FIG. 2A on the x-axis between 24 microseconds (measured from an origin located at the start of time period 201) and 34 microseconds (also measured from the same origin).

Figure 11A:
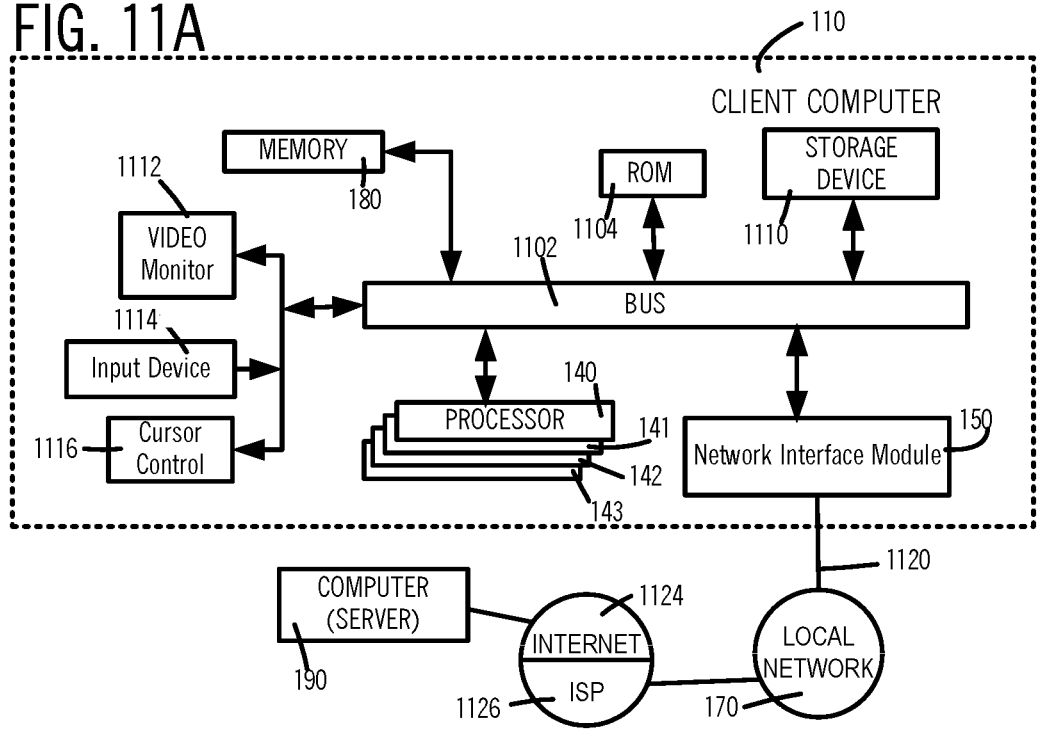
FIGS. 11A and 11B illustrate, in high-level block diagrams, hardware used to respectively implement server 190 and client 110 of FIG. 10, in some illustrative embodiments.

Thereafter, in time period 206 (e.g. illustrated in FIG. 2A on the x-axis between 34 microseconds and 46 microseconds as measured from the origin), process 20 is automatically awakened by operating system 130 (e.g. in response to occurrence of an interrupt), on completion of execution of the processor-external command issued in step 23 (in time period 201 in FIG. 2A), and hence in time period 206, process 20 uses processor 140 to perform step 29 (see FIG. 1A). In step 29, process 120 automatically performs any operations which are normally performed on completion of the processor-external command, e.g. retrieving from memory 180, one or more results of execution of the processor-external command, and displaying the results on video monitor 1112 (FIG. 11A).

Thereafter, as described above in reference to branch 29R, step 23 (FIG. 1A) is performed again in a next iteration, to issue the processor-external command in time period 201 (FIG. 2B), followed by step 25 (FIG. 1A) to again determine polling limit 18A in time period 202 (FIG. 2B). As noted above, polling limit 18A determined again in time period 202 (FIG. 2B) is newer than the previous iteration's new polling limit 18A determined in time period 202 (FIG. 2A). In some embodiments, determination of polling limit 18A in step 25 performed in time period 202 of FIG. 2B uses recent measurements of amount of time needed for completion of execution of the processor-external command (also called "wait time") in iterations performed recently, e.g. uses at least time period 209 in FIG. 2A.

As shown by branch 27D in FIG. 1A, step 29 may be performed in some situations immediately after step 27, without performance of step 28. Such situations may arise when, for example, in an I-th repetition of step 27 in time period 203I, as illustrated in FIG. 2B. Specifically, in time period 203I of FIG. 2B, execution of the processor-external command is found to have been completed in step 27, and hence at this stage process 20 performs step 29 automatically, as illustrated by time period 206 in FIG. 2B. Accordingly, time period 203 in which processor 150 is exclusively used for polling on completion of the processor-external command is shorter in the iteration of FIG. 2B, relative to the iteration of FIG. 2A.

Thereafter, as described above in reference to branch 29R, step 23 (FIG. 1A) is performed once again in another iteration, to issue the processor-external command in time period 201 (FIG. 2C), followed by step 25 (FIG. 1A) to once again determine polling limit 18A in time period 202 (FIG. 2C). Polling limit 18A determined in time period 202 (FIG. 2C) is the newest, and may be different from the previous iteration's newer polling limit 18A determined in time period 202 (FIG. 2B). Specifically, due to the shorter completion of the processor-external command in FIG. 2B (as described above), the time period 203 of continuous polling in FIG. 2C is smaller, as illustrated by time periods 203A-203M.

In FIG. 2A, an amount of time taken (also called "wait time") to complete the command issued in time period 201 is the sum of time periods 203, 204 and 205, which is illustrated as time period 209 of 28 microseconds in duration. Similarly, in FIG. 2B the wait time, shown as time period 209 is same as time period 203 which is 8 microseconds (e.g. if the command is already completed on the 2nd performance of step 27, by the end of time period 203I in FIG. 2B). The just-described two durations of time periods 209 (of the two iterations in FIGS. 2A, 2B) may be used, for example, to determine newest polling limit 18A (for use in the next iteration in FIG. 2C), as weighted average thereof, wherein a weight of 4 is used with the most-recent wait time of 8 microseconds (see time period 209 in FIG. 2B), and a weight of 1 is used with the next-to-most recent wait time of 28 microseconds (see time period 209 in FIG. 2A), to obtain their weighted average as 12 microseconds for use as the newest polling limit 18A.

In the just-described example, in time period 202 shown in FIG. 2C, process 20 performs step 25 to automatically determine newest polling limit 18A as 12 microseconds. Accordingly, process 20 is automatically limited to performing continuous polling on completion of the processor-external command for only 12 microseconds, as shown by time periods 203A, 203I and 203M in FIG. 2C. Hence, in the example of FIG. 2C, after performing step 27 in period 203 for 12 microseconds, process 20 performs step 28 to relinquish its use of processor 140 in time period 204, followed by waiting in a not-runnable queue in time period 205. Thus, performance of step 29 in the example of FIG. 2C begins at 30 microseconds, and continues for time period 206. Use of newest polling limit 18A in the iteration of FIG. 2C reduces latency of process 20 in processing results of the command's completion by 4 microseconds, relative to FIG. 2A's iteration (which begins its results processing at 34 microseconds, at which starts time period 206 in FIG. 2A).

In some embodiments, in step 29 (FIGS. 1A, 1B) performed in time period 206 (FIG. 2A), process 20 is configured to programmatically compute a time difference between a time of completion of the command Tc (FIG. 2A) which is recorded in memory 180 and a time of starting the command Ts (FIG. 2A) which is also recorded in memory 180, and store this difference Tc−Ts in memory 180, as a wait time of the current execution (which just completed). Subsequently, process 20 determines a newer polling limit 18A in the next iteration in time period 202 (FIG. 2B), based at least partially on the current wait time Tc−Ts (FIG. 2A). Specifically, in determining the newer polling limit 18A in time period 202 (FIG. 2B), current wait time Tc−Ts (FIG. 2A). is used by process 20 in step 25, in addition to one or more recent wait times. In some embodiments, described below, such recent wait times and current wait time are identified by use of a window (see FIG. 3B, described below), after the window is moved forward (e.g. in time period 202 of FIG. 2B), to include the current wait time, whereby the window's movement omits one or more wait times, which are thereby no longer used in determining the newer limit.

Although in the preceding three paragraphs above, polling limit 18A is described as being determined by use of a weighted average of recent and/or current wait times, other embodiments may use other functions to determine a polling limit in step 25 (FIGS. 1A, 1B). In some embodiments, step 25 automatically selects a polling limit 18A such that wait times of at least a predetermined percentage (e.g. 85%) of recent executions of the command are less than or equal to the polling limit. Additionally or alternatively, a polling limit may be automatically determined in step 25 based on an indicator of current status which in some embodiments identifies a delay (or on-time status) of a command's current execution.

Figure 10:
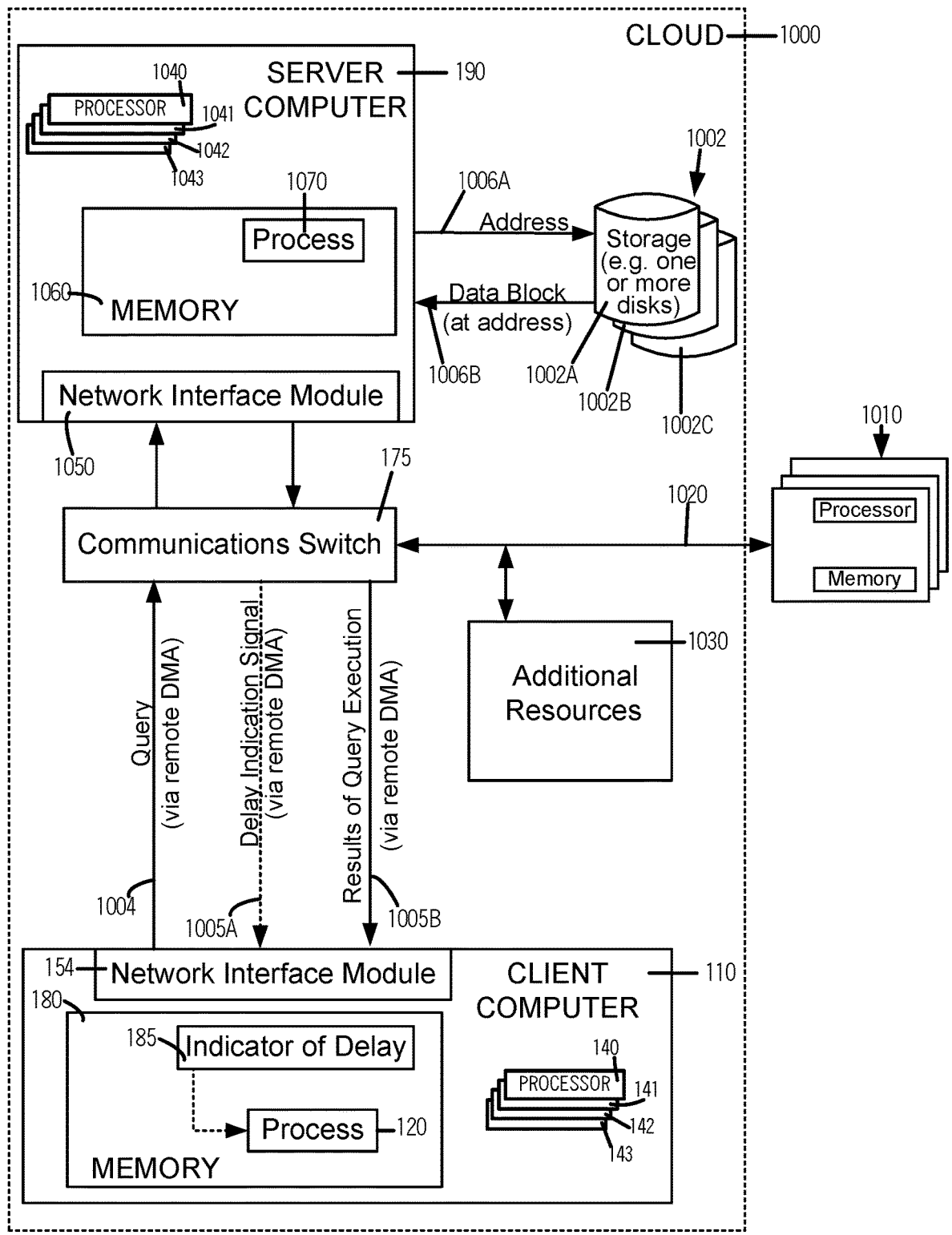
FIG. 10 illustrates, in data flow block diagram, a server 190 and a client 110 either or both of which may perform one or more steps and/or acts of the type illustrated in FIGS. 1A, 1B, 3A, 4, 5A, 5B, 6A, 6B, 6C, 7A and 7B, 8, 9A and 9C.

An indicator 15 (FIG. 3A) of the type just described may be retrieved by process 20 from memory 180. Indicator 15 may be stored in memory 180 by I/O controller 150. I/O controller 150 may use embedded processor 153 to generate indicator 15, e.g. based on one or more signals indicative of latency in directly attached storages 152A-152Z (FIG. 3A), and/or latency in network 170 (FIG. 8) via which port 151 is coupled to one or more remote computers, such as computer 190 (FIG. 10). I/O controller 150 (FIG. 3A) includes circuitry to performs input and output of data to and from various types of storages, such as (1) disk controller 155 that interfaces to directly attached storages 152A-152Z, and (2) network interface module 154 uses port 151 to interface to network attached storages (NAS), or storage area network (SAN) devices.

In some embodiments, process 320 (FIG. 3A) uses processor 140 to performs steps 301-303, 23, 27-29, and 330. Depending on the embodiment, unless stated explicitly otherwise, steps 23, 27-29 of process 320 (FIG. 3A) are implemented similar or identical to above-described step 23 (FIG. 1B) and steps 27-29 (FIGS. 1A, 1B) of process 20. Process 320 (FIG. 3A) starts running (e.g. at time T1 illustrated in FIG. 3B), by performing step 301 of initialization in which one or more variables are set to valid values. Thereafter, at time T2 (FIG. 3B), process 320 performs step 302 to set up a specific connection, between local computer 100 in which process 320 executes, and a specific storage. The specific connection is set up in step 302 of some embodiments by identifying a path to the specific storage, wherein the path is expressed in the form of a uniform resource locator (URL). When the path identifies a remote storage, the specific connection may be opened in step 302 using the Internet Protocol (IP), e.g. to open a TCP connection or a UDP connection via network interface module 154 in I/O controller 150. When the path identifies a directly attached storage, such as storage 152K the connection is set up via disk controller 155 in I/O controller 150 (described above). Note that embedded processor 153 of I/O controller 150 which is used to set up the specific connection, operates simultaneously with operation of processors 140-143 in computer 110 (FIG. 3A). A specific connection of the type described above may exist for a duration that is several orders of magnitude lager than time periods shown in FIGS. 3B and 3C, e.g. a session may exit for 30 minutes duration. In some embodiments, a session's duration may be of the same order as a life time of process 320. In illustrative examples, the lifetime of a process may be 30 minutes, or a few hours.

Thereafter, process 320 performs step 303 to issue in the specific connection (which is set up in step 302), a processor-external command of the type described above in reference to FIGS. 1A, 1B and 2A-2C, which in the embodiments of FIG. 3A is an I/O command. The I/O command is executed by embedded processor 153 (FIG. 3A) in I/O controller 150, which is configured to execute the I/O command on receipt thereof from processor 140, to input and/or output data (also called "data input-output" or simply I/O). Hence, in step 303, process 320 repeatedly checks for completion of the I/O command and relinquishes its processor on reaching a preset limit. The preset limit is a fixed constant, which is retrieved from storage (e.g. directly attached storage 152A) during initialization in step 301. In step 303, when the I/O command is found to have completed during the checking (which may be before processor relinquishment, or after a new time slice is allocated following processor relinquishment), process 320 goes to step 304. In step 304, process 320 computes and stores in memory 180, the amount of time taken by the I/O command to complete execution (also called "wait time"). Note that although in FIG. 3A, process 320 is illustrated as computing and storing the wait times in memory 180, in alternative embodiments, embedded processor 153 in I/O controller 150 may be configured to perform this operation of computing and storing the wait times in memory 180.

On completion of the I/O command in step 303 followed by storage of its wait time in step 304, process 320 takes branch 304R, to repeat this step 303 multiple times, e.g. N times, which results in N wait times being stored in memory 130. In some embodiments, performance of repetitions of step 303 via branch 304R ends at time T3B illustrated in FIG. 3B. A time period between times T2 and T3B in FIG. 3B identifies "Phase S" of process 320, wherein stoppage of repeated polling is based on a fixed constant, e.g. PLmax, described below. After Phase S, process 320 enters a different Phase D (FIG. 3B) wherein stoppage of repeated polling is based on a variable, described herein as polling limit 18A.

Specifically, in step 305 (FIG. 3A), process 320 determines a new value of polling limit 18A (also called simply, "new polling limit"), e.g. by ascertaining a duration, such that at least a fixed percent (e.g. 80%) of the recent executions of the I/O command complete within the duration. A probability of completion of a current execution of the I/O command within this duration, may be expected in such embodiments, to approximate (e.g. be within 10% of) the just-described fixed percent (e.g. completion probability of the I/O command, within this duration, is expected to be around 80%). Hence, in several such embodiments process 320 performs step 305 to compare to a preset upper bound (e.g. PL max), the duration which has been ascertained from recent executions.

When the duration ascertained is below or equal to the preset upper bound (see step 305 in FIG. 3A), the duration is stored by process 320 in memory 180 as new polling limit 18A. New polling limit 18A is used in step 27 (FIG. 3A) as described above in reference to FIGS. 1A, 1B and 2A-2C to stop repetitive checking on the I/O command, which is issued in step 23 (FIG. 3A) after step 305 is performed. Hence, after steps 23 and 27 are performed, steps 28 and 29 in FIG. 3A are also performed, in a manner similar or identical to respective steps 27-29 described above in reference to FIGS. 1A, 1B and 2A-2C. On completion of step 29 in FIG. 3A, process 320 performs step 330 to compute and store in memory 180, a wait time of the I/O command's current execution (which just completed, before step 29), followed by branch 29R to return to step 305 (described above).

Although step 305 is illustrated in FIG. 3A as being performed before step 23, in certain embodiments, step 305 may be performed after step 23 in which case branch 29R returns control to step 23 from step 330. Moreover, in many embodiments, step 305 is performed after step 330 at the end of the loop, followed by branch 29R to return control to step 23 from step 305. In the just-described embodiments, step 305 is additionally performed once initially before entering the control flow loop starting with step 23 (in which branch 29R ends).

Figure 3B:
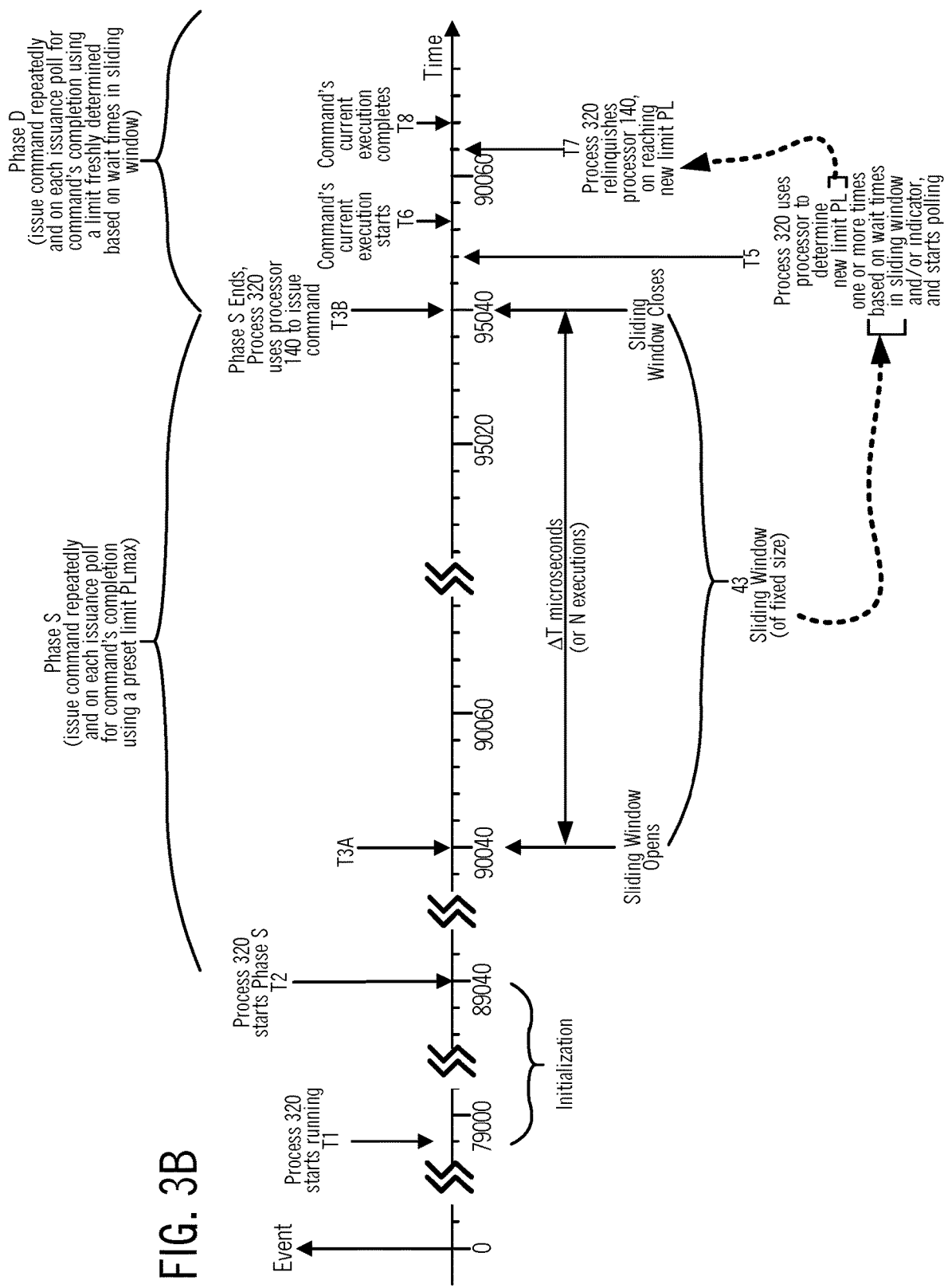
FIG. 3B illustrates, in a timing diagram, operation of process 20 in a first phase S wherein a preset limit PLmax is used to end busy polling, followed by a second phase D wherein the limit to stop polling is freshly determined multiple times, e.g. as new limit PL at time T5 (FIG. 3B), based at least partially on recent wait times identified by use of a sliding window in some embodiments.

In some embodiments, the wait times used in step 305 (FIG. 3A) are of recent executions of the I/O command, which are identified by use of a window of fixed size that is moved forward at least on each issuance of the I/O command (also called "sliding window"). Depending on the embodiment, the sliding window's size is fixed in duration ΔT (e.g. 5 milliseconds), or fixed in number N of executions of the I/O command (e.g. 500 executions). As illustrated in FIG. 3B, sliding window 43 is shown to end at time T3B, which occurs when process 320 issues an I/O command. Sliding window 43 opens at a time T3A, such that the duration between times T3A and T3B is determined by the size of sliding window 43. All executions of the I/O command, which complete within duration T3A to T3B of sliding window 43 are identified as "recent" executions. Wait times of these recent executions are used by process 320 in performing step 305 (FIG. 3A) at time T5 (FIG. 3B), to determine the new polling limit 18A.

Thereafter, between times T5 and T7 (FIG. 3B), process 320 performs step 27 (FIG. 3A) to repeatedly check on completion of the I/O command, without relinquishing processor 140 between iterations. The I/O command is executed (in embedded processor 153) as illustrated in FIG. 3B, between times T6 and T8. At time T7 which occurs between T6 and T8, process 320 reaches polling limit 18A (determined at time T5, in step 305 described above), and therefore relinquishes processor 140. At this stage, processor 140 is made available by operating system 130 to other processes (or threads), to reduce processor load (also called "CPU" load).

Hence, in the example shown in FIG. 3B, process 320 is in a not-runnable queue at time T8 when the I/O command completes. At time T9 (FIG. 3C), process 320 is allocated a new time slice by operating system 130 and is awakened. At this stage, process 320 may store a wait time of the current execution in memory 180 by performing step 330 (FIG. 3A).

Although the I/O command's execution ended at time T8, process 320 is not running at time T8 (due to process 320 being on the not-runnable queue, having relinquished its processor at time T7). Hence, T9 or shortly thereafter is the earliest time at which ending of the I/O command is identifiable by process 320. Therefore, process 320 stores a duration of T9–T6 in memory 180, as the current execution's wait time.

Figure 3C:
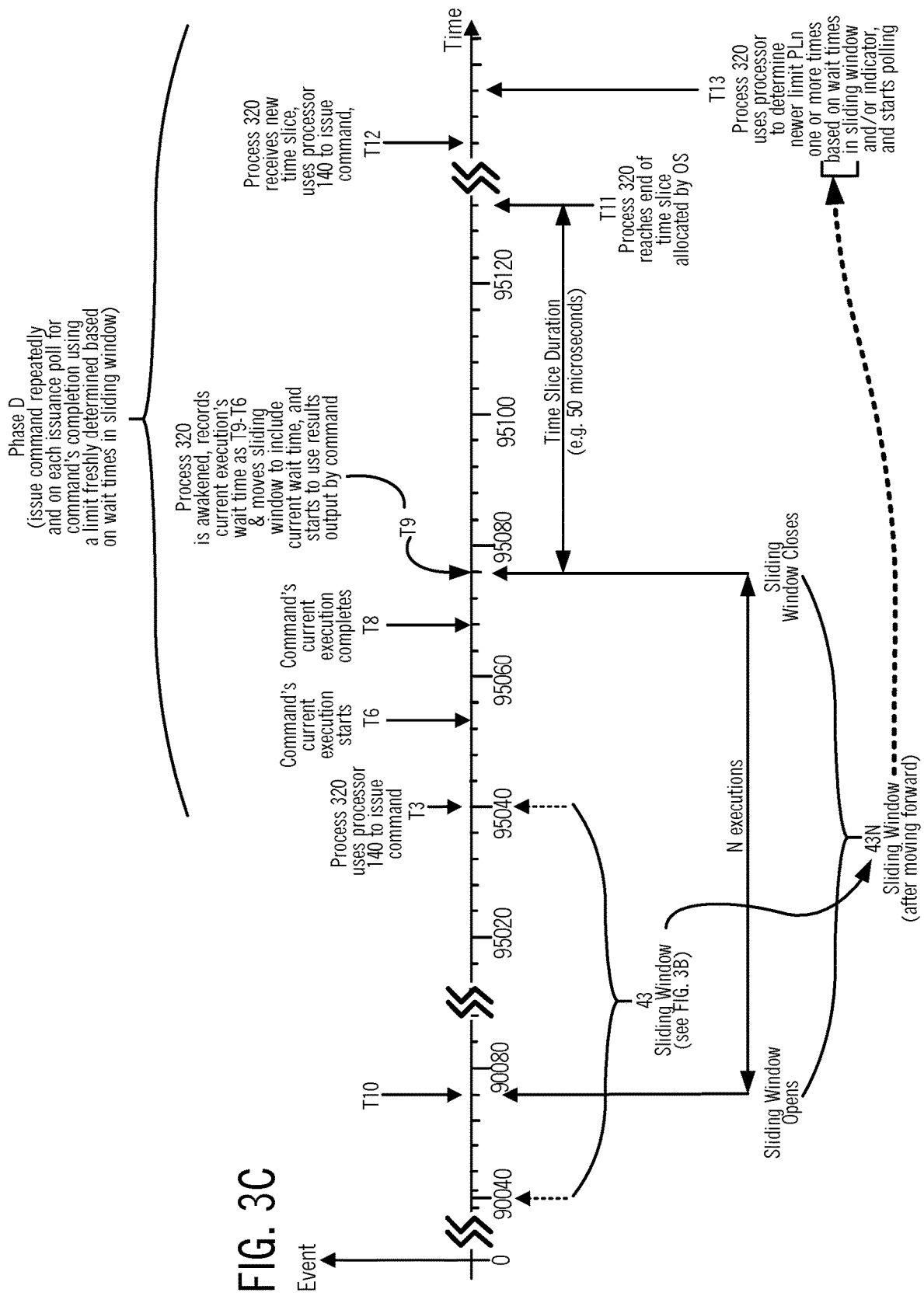
FIG. 3C illustrates, in a timing diagram, a window 43N of fixed size N expressed in number of executions (moved from its location shown by window 43 in FIG. 3A), moved to close at time T9 at which process 320 is awakened and records T9 as the time of completion of the command's current execution, and computation at time T13 of newer limit PLn based on wait times identified by window 43N.
Figure 3D:
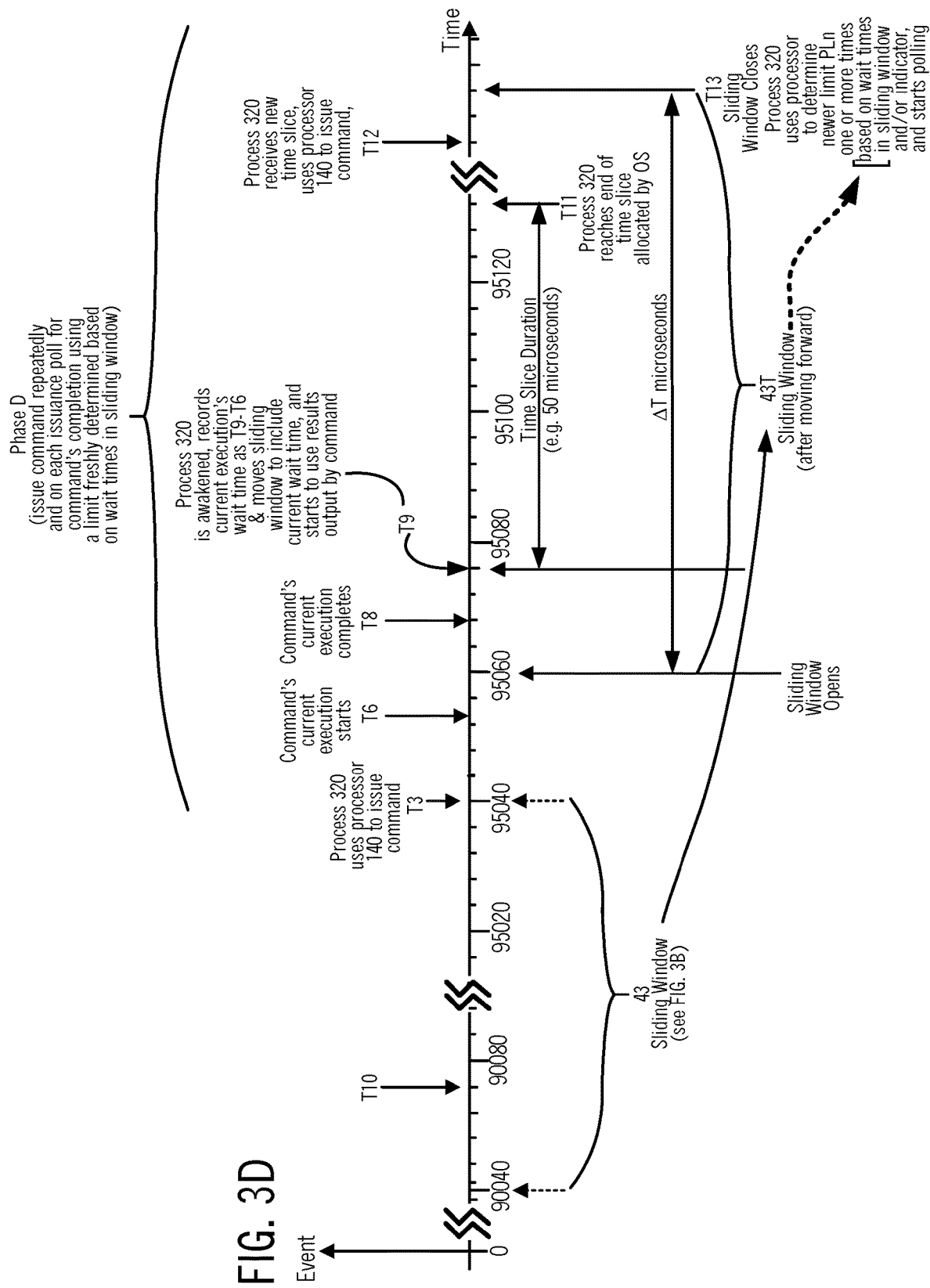
FIG. 3D illustrates, in a timing diagram, a window 43T of fixed size ΔT expressed in units of time (moved from its location shown by window 43 in FIG. 3A), to close at a current time T13 after which newer polling limit PLn is determined based on wait times identified by window 43T.

In some embodiments, at this stage process 320 may also move sliding window 43 of FIG. 3B forward, which is thereafter shown in FIG. 3C as sliding window 43N. At time T11, process 320 reaches the end of its allocated time slice, and is put into the not-runnable queue by operating system 130. Thereafter, at time T12, process 320 receives a new time slice and is awakened by operating system 130, and at this time process 320 issues the I/O command again (e.g. by performing step 23 shown in FIG. 3A). Subsequently at time T13, process 320 uses its processor to determine a newer polling limit 18A, based on wait times in the sliding window 43N. The wait times in sliding window 43N include the wait time of the current execution's duration D, which is the time difference T9–T6 (as described above). Hence, newer polling limit 18A changes depending at least partially on value D, which now (at time T13) is the wait time of the most-recent execution of the I/O command (between times T8 and T6). The just-described most-recent execution is one of multiple recent executions (e.g. 500 executions), identified by sliding time window 43N, and these recent executions' wait times are used by process 320 to determine polling limit 18A.

In some embodiments, operating system 130 includes a service 430 (FIG. 4) that may use any of processors 140-143 to perform steps 404, 405 and 406 at any time relative to steps 301-303, 23, 427, 28 and 29 that are performed by process 420 which in turn may use any other of processors 140-143 simultaneously when a time slice thereof is allocated to process 420. Specifically, steps 404 and 406 compute wait times as described above in reference to steps 304 and 330, followed by storing the computed wait times, e.g. in array 184. In some embodiments, array 184 is stored by service 430 in memory 180 at storage locations that are readable by process 420. Step 404 or step 406 is performed by service 430, in response to completion of an I/O command issued by process 420. Specifically, when any I/O command completes, operating system 130 is notified, e.g. by I/O controller 150, and service 430 uses this notification to perform step 404 (e.g. if process 420 is in Phase S) or step 406 (e.g. if process 420 is in Phase D). Steps 404 and 406 may be implemented by a single piece of software in operating system 130, in which case this piece of software is executed on receiving the notification, regardless of whether step 404 or 406 is to be performed (i.e. regardless of whether process 420 is in Phase S or Phase D).

Depending on the embodiment, instead of or in addition to the just-described wait time computation, service 430 performs step 405 to determine a new polling limit 18A, based at least partially on an array 184 of wait times, e.g. similar to step 305 described above, e.g. by using a sliding window to identify recent wait times in array 184. The new polling limit 18A is thereafter stored in memory 180 for use by step 427 in process 420. Step 427 is implemented in a manner similar or identical to step 27 of FIGS. 1A, 1B and 3A described above, except that step 427 reads new polling limit 18A from a storage location in memory 180 wherein service 430 stores the result of performing step 405.

Figure 8:
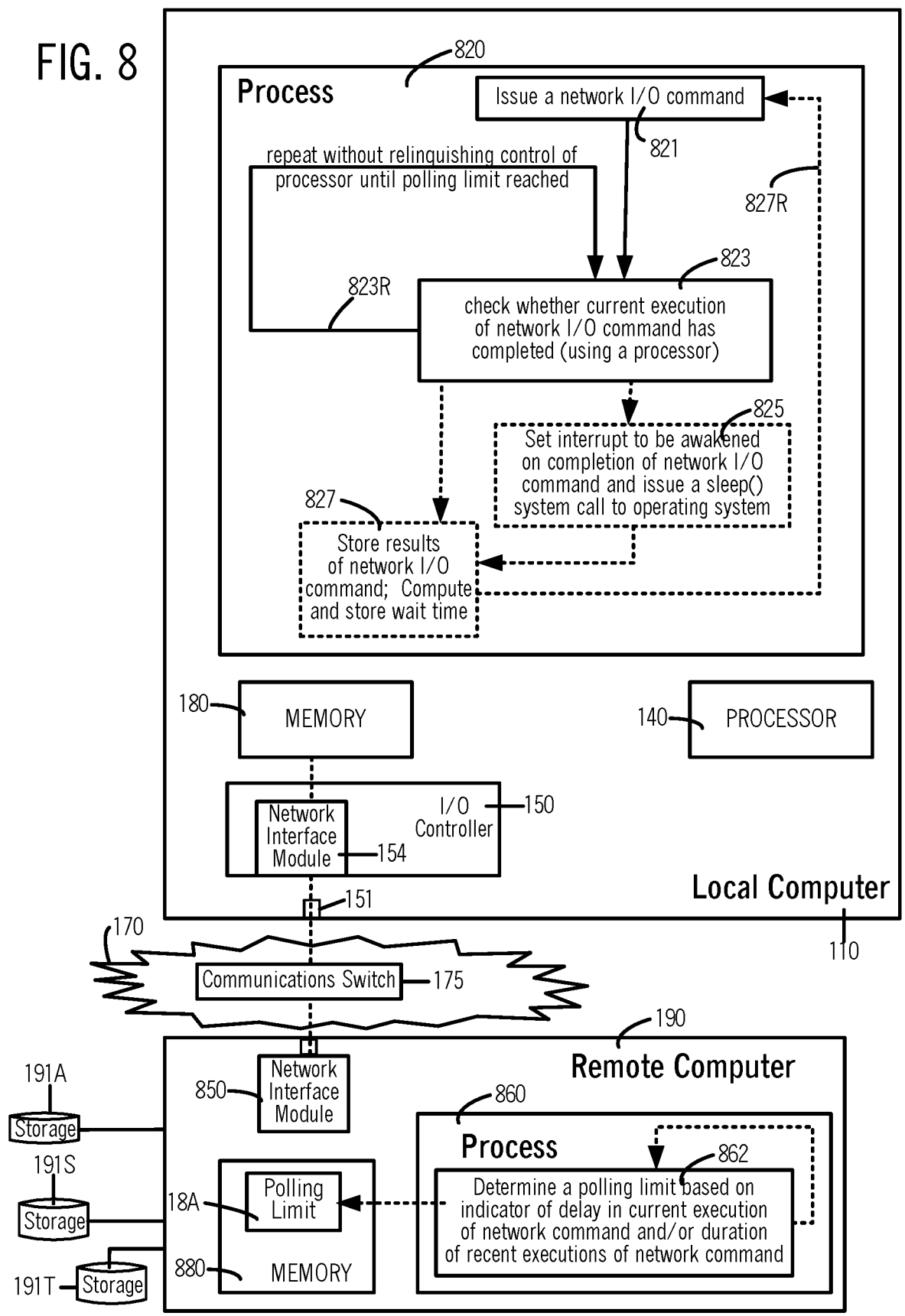
FIG. 8 illustrates, in a high-level flow chart, an alternative embodiment which implements process 820 in local computer 110, with polling limit determination in step 862 being implemented in a process 860 in a remote computer 190.

Recent wait times which are used in step 405 may be identified by the sliding window of service 430 differently, depending on the embodiment. For example, in some embodiments, a sliding window used in service 430 is configured to identify wait times of a specific I/O command issued over a specific connection (e.g. similar to step 305 described above), and these wait times are for the I/O command from a specific process 420 to transfer data to or from a specific storage, which may be, for example, a directly attached storage, such as storage 152K (FIG. 3A) or a network attached storage, such as storage 191S (FIG. 8) depending on the embodiment. In other embodiments, the sliding window of service 430 is configured to identify wait times of multiple I/O commands issued over multiple connections, and these wait times are still between a specific process 420 to transfer data to or from a specific storage. In still other embodiments, the sliding window of service 430 is configured to identify wait times of multiple I/O commands issued over multiple connections by multiple processes (which may be similar or identical to process 420), all of which transfer data to and/or from a specific storage 191S (FIG. 8).

In yet other embodiments of the type described in the preceding paragraph above, the sliding window of service 430 is configured to identify wait times of multiple I/O commands issued over multiple connections by multiple processes (which may be similar or identical to process 420) to transfer data to and/or from multiple storages, for storages attached to a specific computer, such as remote computer 190 and for a specific tier (e.g. storages implemented in static random access memories (SRAMs) may be a first tier, or storages implemented on hard disks may be a second tier, or storages implemented on magnetic tapes may be a third tier). In certain alternative embodiments, the sliding window of service 430 is configured to identify wait times for a specific I/O command even though issued by different processes (which may be similar or identical to process 420, and of the same privilege as one another) to transfer data to and/or from multiple storages attached to a specific remote computer 190, for multiple connections that traverse a common path through network 170. An example of the just-described common path is a network path that connects computers 110 and 190, and passes sequentially through a specific set of nodes in network 170, via a specific set of communication links there-between.

In several embodiments of step 405, after a duration ascertained is determined to be below the preset upper bound (e.g. similar to step 305 described above), a value of the duration is adjusted in step 405 based on an indicator 16 of current status which may be internal to computer 100 and/or received in computer 100, from a remote computer 190. In some embodiments, indicator 16 may identify a delay or on-time status of the I/O command's current execution due to changes in, e.g. (a) responsiveness of a remote computer used as a source of data on which the I/O command is executed, and/or (b) latency of a network 170 (FIG. 8) between local computer 100 (in which process 420 is running) and remote computer 190 and/or (c) status in local computer 100 (e.g. processor load or memory usage). In such embodiments, indicator 16 of current status is used to increase or retain unchanged, the duration's value determined as described above. Thus, a value which results from the just-described use of indicator 16 is stored in memory 180 as new polling limit 18A, for use in step 427 of process 420.

Thus, in embodiments of the type shown in FIG. 4 (described above), a new polling limit 18A (which is included in limiting condition 18) is determined external to process 420 (which is similar to process 20 described above), in a step 405 (FIG. 4) by service 430 of operating system 130. As noted above, by use of different processors 140-143, step 433 (FIG. 4) may be performed by service 430 simultaneously with performance of steps 23 and 427 (which is similar to step 27) by process 420. In the just-described embodiments shown in FIG. 4, step 405 of determining a new polling limit 18A is performed by service 430 only after process 420 starts running (which therefore, occurs during a lifetime of the busy-polling process, in this case process 420), and hence even though new polling limit 18A is determined outside of process 420, the determination may still be based on one or more recent wait times, which therefore enable stoppage of repeated polling in process 420 to be made responsive to circumstances external to processor 140.

Figure 5B:
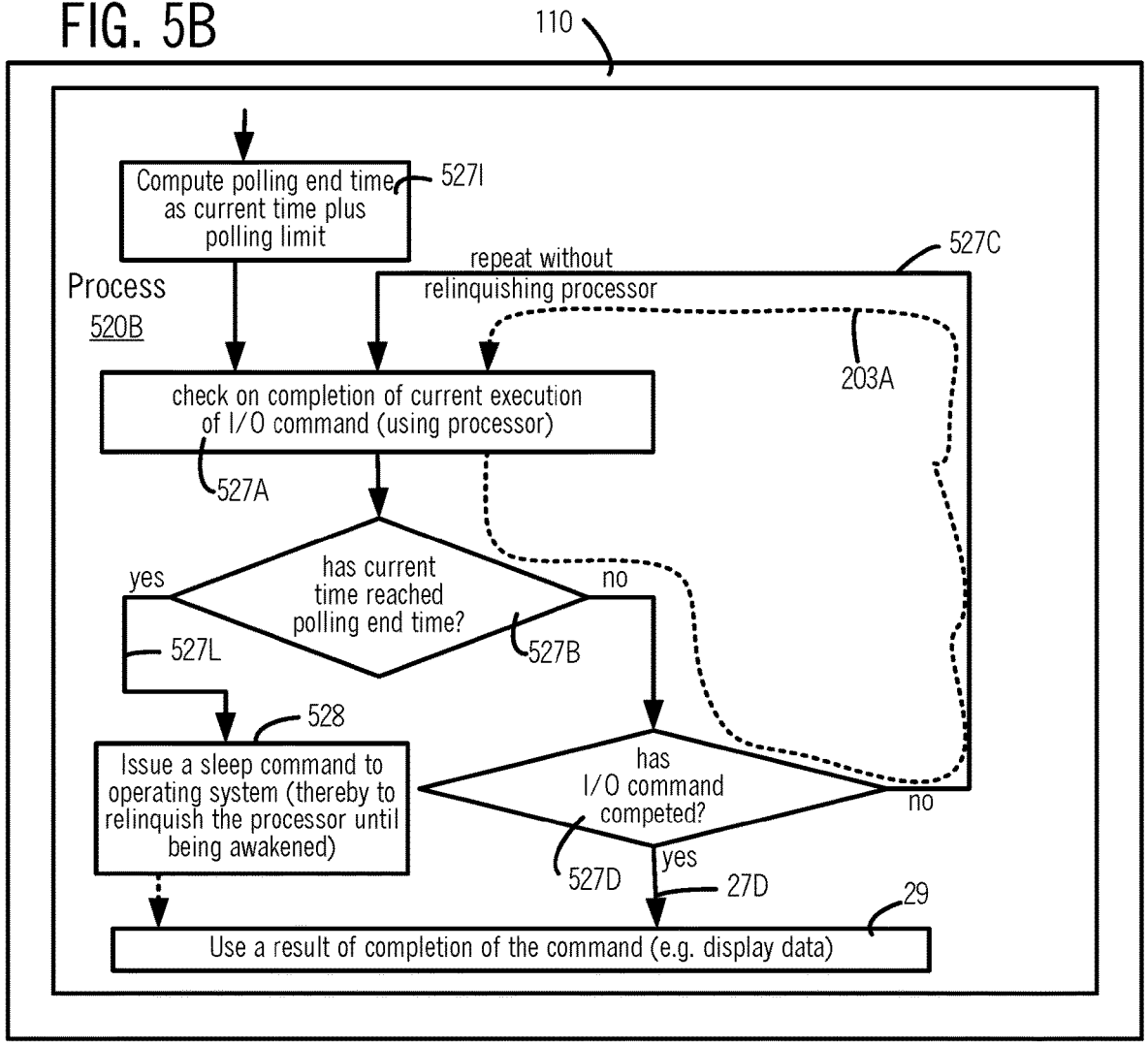
FIG. 5B illustrates, in an intermediate-level flow chart similar to FIG. 5A, steps 527I, 527A, 527B, 527D used to implement repeated polling in process 520B in some embodiments.

In some embodiments, step 27 of FIGS. 1A, 1B may be automatically implemented by performing steps 527A, 527B, 527D, and 527P (see FIG. 5A), as follows. Specifically, in step 527A, process 520 automatically checks on completion of a current execution of a newly-issued I/O command. This I/O command is issued newly in step 23 by using processor 140 (e.g. as described above in reference to FIGS. 1A, 1B), to input data from or output data to a storage accessed via a network connection (such as a TCP connection or a UDP connection), which may be implemented by I/O controller 150 that includes therein a network interface module. Thereafter, in step 527B, if a polling parameter (e.g. cumulative duration of steps 527A, 527B, 527D, and 527P) has reached new polling limit 18A (e.g. determined in step 25 as described above), then branch 527L is automatically taken to go to step 528. In step 527B, process 520 automatically retrieves new polling limit 18A from memory 180, in certain embodiments wherein new polling limit 18A is stored in memory 180.

In step 527B, if the answer is no, then process 520 automatically goes to step 527D. In step 527D, process 520 automatically evaluates a result of step 527A, and if the I/O command is found to have been completed, branch 27D is taken to go to step 29 (described above). In step 527D, if the answer is no, then process 520 automatically goes to step 527P wherein the polling parameter is computed. In one example, the polling parameter is number of repetitions of polling, automatically initialized to 1 on a first iteration, and automatically incremented in subsequent iterations of step 527P. In another example, the polling parameter is duration of continuous polling 203 (see FIGS. 2A-2C), which is a product of the number of repetitions of polling (described in the preceding sentence) and a time period 203A (see FIGS. 2A-2C) over which steps 527A, 527B, 527D, and 527P are performed in one iteration. In some embodiments, instead of performing step 527P in a loop, a step 527I (FIG. 5B) is performed outside the loop before step 527A. In step 527I (FIG. 5B), a process 520B computes a time at which the loop is to end (also called "polling end time"), by adding to the current time, the polling limit. This polling end time is then used in step 527B in FIG. 5B to check if the current time has reached (or exceeded) the polling end time computed in step 527I and if yes then branch 527L is taken to step 528 (described above).

In some embodiments, operating system 130 of FIGS. 1A, 1B may implement steps 331, 332 and 333 (see FIG. 5A) automatically, as follows. In step 331, operating system 130 responds to step 23 (shown in FIGS. 1A, 1B) performed by process 520 (FIG. 5A), by driving a signal active on a control line to I/O controller 150. In response to the just-described signal becoming active, I/O controller 150 uses a network interface module therein to initiate a data transfer, on a port 151 of computer 110 which is coupled to network 170 (FIG. 8). Subsequently, in step 332, operating system 130 responds to step 28 (shown in FIGS. 1A, 1B, described above) which is performed by process 520, by transferring control of processor 140 from process 520 to any process 160 in the normal manner of performing a context switch. For example, in step 332, operating system 130 may save register values and stack information of process 520 in memory 180, select process 160 from a runnable queue, and load from memory 180 register values and stack information of process 160, followed by allocating a time slice (e.g. of 50 microseconds duration) to process 160 and transferring control of processor 140 to process 160. Thereafter, in step 333, operating system 130 responds to a signal from the network interface module in I/O controller 150 indicating that the I/O command has completed, by executing an interrupt service routine to transfer control of processor 140 to process 520 in the normal manner of performing a context switch (including allocating a time slice thereto). At this stage, process 520 is awakened by operating system 130, and therefore process 520 starts performing step 29 (described above).

In some embodiments, processor relinquishment in step 28 of FIGS. 1A, 1B may be implemented by automatically performing steps 628A, 628B, 628C, and 628D (see FIG. 6A) as follows. Specifically, in step 628A, process 620 automatically sets up an interrupt to be awakened on completion of the I/O command and thereafter goes to step 628B. In step 628B, process 620 automatically sets up another interrupt to be awakened after a sleep time period (also called "timeout"). Depending on the embodiment, the sleep time period (also called "sleep period") may be predetermined, or may be determined dynamically in step 25 (FIG. 1A) or step 22 (FIG. 1B) for each execution of the I/O command. Thereafter, process 620 performs step 628C by automatically issuing a sleep command to operating system 130. As noted above, at this stage process 620 has relinquished processor 140, and hence processor 140 is assigned by operating system 130 to another process 160. Subsequently, on being awakened by operating system 130 executing an interrupt service routine (e.g. either due to passage of the sleep time period or due to completion of the I/O command), process 620 performs step 628D to automatically check whether the I/O command has completed, and if not yet completed, process 20 returns to step 628B via branch 628R, thereby to automatically implement a loop in which processor 140 is relinquished on each execution of step 628C. In step 628D, if the I/O command has completed, process 620 goes to step 29 (described above). In certain embodiments, an example of a sleep period which may be specified by process 620 is 30 seconds, and in some embodiments the sleep period is manually set by a user although in other embodiments a sleep period may be programmatically determined and/or programmatically adjusted from a fixed constant.

Figure 6A:
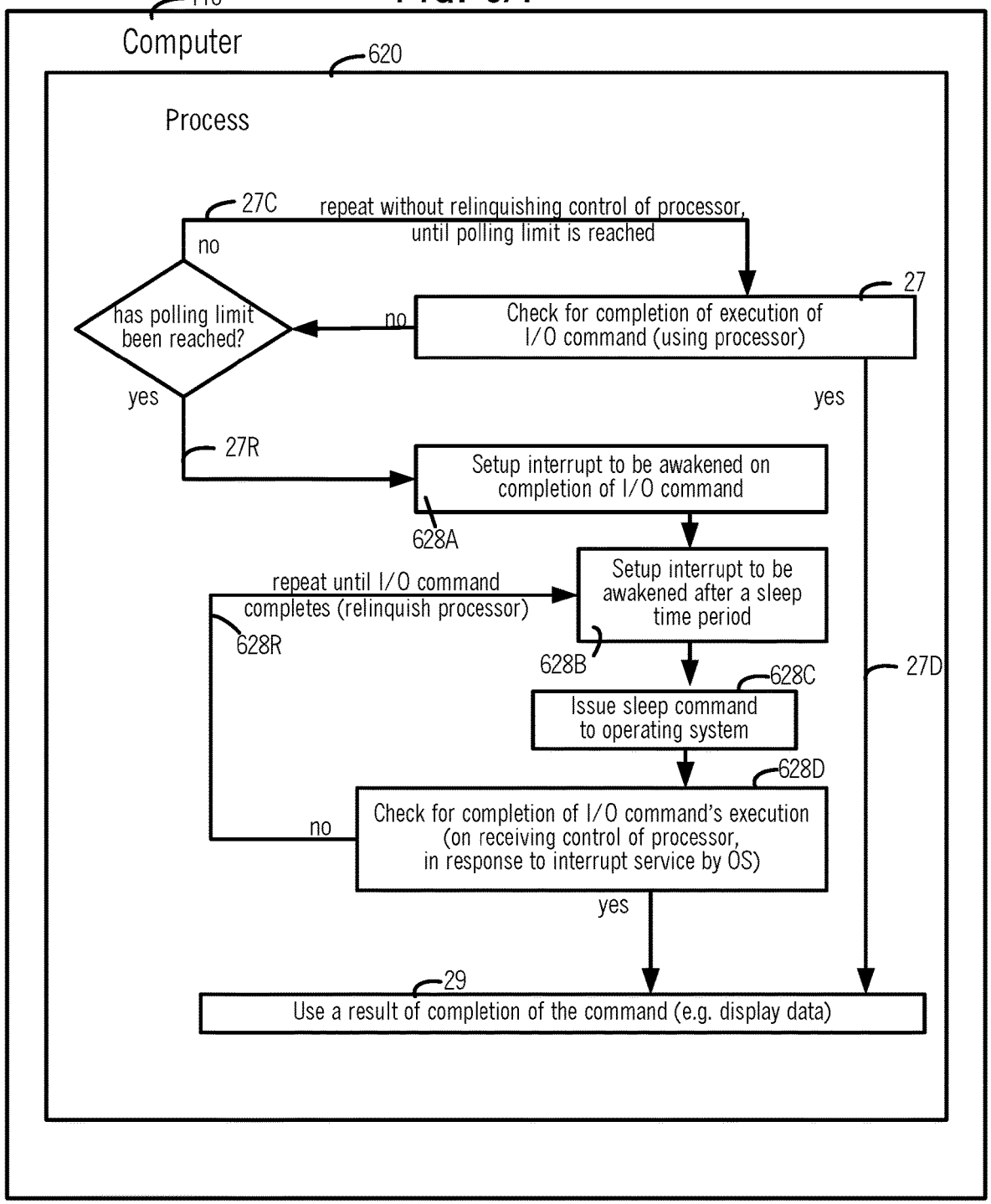
FIG. 6A illustrates, in a high-level flow chart, steps of process 620 including setup of interrupts and issuance of a sleep command to implement processor relinquishment in some embodiments.

Although in some embodiments, a polling limit's new value (also referred to as "new polling limit") is automatically determined in step 25 after issuance of an I/O command in step 23 (FIG. 1A), in other embodiments the polling limit's new value 18A may be automatically determined (in whole or in part) before step 23, e.g. in step 22 (FIG. 1B) which is normally performed after completion of a prior execution of the I/O command (in such embodiments, the prior execution occurs during a lifetime of process 20 that is currently running). Moreover, in some embodiments as illustrated in FIG. 6B, the polling limit's new value 18A is automatically determined by step 22 in process 630. Process 630 is similar or identical to one or more of processes 20 (FIGS. 1A, 1B), 320 (FIG. 3A), 420 (FIG. 4), 520 (FIG. 5A) and 620 (FIG. 6A), unless described otherwise. Step 22 is performed in process 630 before start of repeated polling. Step 22 is followed by issuance of the I/O command in step 23, which in turn is followed by step 635. Step 635 automatically determines the polling limit's new value 18A again.

Specifically, in step 635, process 630 of several embodiments automatically determines the polling limit's new value 18A, e.g. expressed as a time limit on repeated polling (or as numerical limit on number of repetitions of polling) based at least partially on, for example, wait times of executions of the I/O command that completed after step 22. In performing step 635, process 630 of certain embodiments automatically determines the polling limit's new value 18A, e.g. by changing the time limit or numerical limit (which may have been just determined, as noted in the preceding sentence, or which may have been determined in step 22 prior to step 23), based on retrieving from memory 180 an indicator 16 (see FIG. 6C) of delay in the current execution of the I/O command and/or another indicator 185 (see FIG. 10) of delay.

Indicator 16 may be generated locally in computer 110 or received from a remote computer (see computer 190 in FIG. 8). In many embodiments, indicator 16 is retrieved by process 630 from memory 180 in step 635, after issuance of the I/O command in step 23. Accordingly, indicator 16 identifies changes in status that occur immediately before, or during execution of the I/O command. In some embodiments, in step 635, instead of or in addition to indicator 16, process 630 may use indicator 185 described below in reference to FIG. 9C. Specifically, process 630 is configured in some embodiments, to be aware of incoming data patterns, and based thereon, automatically generate in memory 180, indicator 185 that identifies Δ microseconds of increase (or decrease) in the polling limit's new value 18A which has been determined in step 635 or in step 22 (described above). Automatic computation of the just-described Δ microseconds as indicator 185 in memory 180 of computer 110 may be additionally or alternatively based on processor load within computer 110, and/or measurements of how long certain operations are taking to complete in computer 110.

An application or other process in remote computer 190 (which receives the I/O command from process 630 in computer 110), may provide hint information or other such indicator 185, which may be received in a delay indication signal 1005A (see FIG. 10, described below) related to completion of I/O command 183 (see FIG. 9C), e.g. whether a packet of data is the last packet, in completing execution of the I/O command 183. Continuous polling by looping via branch 637C from step 27 to step 635 (FIG. 6B) may be automatically switched off in some embodiments, if a response to the I/O command 183 is indicated (e.g. by remote computer 190, received therefrom in delay indication signal 1005A in FIG. 10, described below) to arrive after more than polling limit's time value 18A. Specifically, in response to receipt of I/O command 183 (e.g. SQL query 1004 in FIG. 10, described below), computer 190 may initially provide a delay indication signal 1005A.

Delay indication signal 1005A (see FIG. 10, described below) may identify, for example, processor load within computer 190, and/or when next I/O will be done, and/or processing delay due to contention, and/or other status, to indicate to process 630 in computer 110, whether there is relatively small delay (e.g. less than a fraction of a time slice) in current execution of I/O command 183, in which case process 630 may go to step 27 followed by branch 637C thereby to stay in continuous polling (FIG. 6B). In step 635, process 630 may lengthen the polling limit's value 18A to become greater than PLmax, or may receive indicator 185 of a relatively large delay (e.g. more than a time slice), in which case process 630 may exit via branch 635E to step 636 to relinquish processor 140 by implementing a sleep phase (described below). Instead of a time slice, a fixed length of time may be used in some embodiments of process 120, to distinguish between a small delay and a large delay.

If remote computer 190 indicates in a delay indication signal 1005A (FIG. 10), a relatively small delay of $\Delta$ microseconds relative to normal (which is stored in memory 180 as indicator 185), a polling limit PL's value 18A may be correspondingly increased automatically by $\Delta$ in step 635 (FIG. 6B), followed by going to step 27 (described above), followed by taking branch 123R to return to step 522B. If remote computer 190 (FIG. 10) indicates in delay indication signal 805A, a delay $\Delta$ (stored in memory 180 as indicator 185, see FIG. 9C), such that PL+$\Delta$>PLmax which is an upper bound, repeated polling may be automatically stopped, by taking branch 635E to step 636. In FIG. 6B, process 630 automatically goes from step 27 to step 636 (described below) via branch 637R, when the polling parameter reaches the polling limit's value 18A (while continuous polling in step 27).

In step 636 (FIG. 6B), process 630 automatically sets an interrupt to be awakened on the earlier of: (a) completion of (i.e. ending of performance of) the current I/O command 183, or (b) after a sleep time period, which may be determined by process 630 in step 22, for example as a multiple of the polling limit (e.g. 10×polling limit). After step 636, process 630 automatically issues a sleep command in step 628C (described above). On being awakened from sleep, process 630 automatically checks in step 628D (FIG. 6B) as to whether the I/O command 183 has completed, and if yes process 630 automatically performs step 29. If the answer in step 628D (FIG. 6B) is no, process 630 automatically returns, via branch 628R to step 636 (described above). To summarize, in some embodiments, process 120 using processor 140 specifies a sleep time period after which process 120 is to be awakened, process 120 is put to sleep thereby to relinquish processor 140, and after being awakened, process 120 uses processor 140 to check whether the command issued has completed.

In step 29 (FIG. 6B), process 630 automatically uses results of the I/O command 183. Additionally, in step 29, process 630 uses a time T2 at which the I/O command 183 completed and a time T1 at which the I/O command 183 was issued, to automatically determine a difference T2−T1=i which is thereafter stored in memory 180, as a duration of a current execution of the I/O command 183, e.g. by incrementing an element of array $\Delta$ at location indexed by i, or A[i]++(see FIG. 9B and its description below). Memory 180 may include multiple arrays, such as array $\Delta$ in storage locations 184, and similar arrays in storage locations 188B-188Y. As to which of these arrays is updated in step 29 as just described depends on the embodiment. Certain embodiments may collect wait times only for a specific command issued on a specific connection. Other embodiments may collect wait times for a specific command, but across multiple connections that are implemented on a common network path from computer 110 to a specific storage (e.g. identified by a URL) in remote computer 190 e.g. across multiple processes in computer 110.

Some embodiments are designed to aggregate wait times for commands having different attributes of the type described in the preceding paragraph, based on empirical data which may indicate when aggregated, such wait times are sufficiently predictive of an issued command's own wait time. The empirical data may be collected under different system-wide and/or local conditions in computer 110, computer 190 and network 170, such as varying load or pressure on a switch, process scheduling delays, availability of resources like CPU, memory, type of command, computational time required, and pattern of issuance of such commands.

After step 29, process 630 returns to step 22 (described above), which uses the just-described duration retrieved from memory 180, in automatically determining polling limit's value 18A (e.g. in addition to retrieving and using other such durations of recent executions of the I/O command 183, if available in memory 180). When step 22 is performed for the very first time, polling limit's value 18A may be automatically set to a predetermined constant, e.g. 10 microseconds, in the absence of any measurements or metrics (in memory 180) of durations of recent executions of the I/O command 183. In some embodiments, when step 22 is first performed in process 630, a polling limit's value 18A is initialized to PLmax (described below, in reference to FIGS. 9A-9B). In an illustrative example, the value of PLmax is 50 microseconds.

In some embodiments, a computer 110 (FIG. 6C) includes a memory 180 that in turn includes a code memory 181 and a data memory 182. Code memory 181 (see FIG. 6C) stores software including instructions to perform steps 23, 27, 648, 29 and 650 which are performed similar to respective steps 23, 27, 28, 29 and 25 shown in FIG. 1A (described above) unless described otherwise. Moreover, data memory 182 (see FIG. 6C) stores a limiting condition 18 which is automatically determined by computer 110, based on factors 16 and 17 (also stored in data memory 182).

In some embodiments, a process 640 (also called "polling process") in computer 110 issues a command in step 23 (FIG. 6C), and thereafter enters a loop by repeatedly and automatically performing step 27 via branch 27C while limiting condition 18 is not satisfied. The just-described limiting condition 18 is determined automatically after completion of one or more recent executions of the command, and this determination may be done before or after or partially before and partially after, step 23. For example, step 714 in FIG. 7A (described below) performs limiting-condition determination before step 723 that corresponds to step 23 of FIG. 6C. As another example, step 725 in FIG. 7B (described below) performs limiting-condition determination after step 723. Referring back to FIG. 6C, process 640 checks in step 27 on whether the command (issued in step 23) has completed, and if not completed process 640 loops back to step 27 via branch 27C (FIG. 6C). When the limiting condition 18 is satisfied, process 640 goes from step 27, via branch 27R to step 648 (FIG. 6C).

In step 648, process 640 relinquishes the processor used in step 27 (FIG. 6C), and then waits indefinitely for the command to complete without using any processor. When the command completes in step 29, process 640 goes to step 29 described next. Process 20 also goes to step 29, directly from step 27 via branch 27D when the command is found to have been completed in step 27 (which checks on its completion). In step 29, process 640 uses the data resulting from completion of the command, e.g. retrieves the resulting data from memory 180 and displays the data.

Figure 6C:
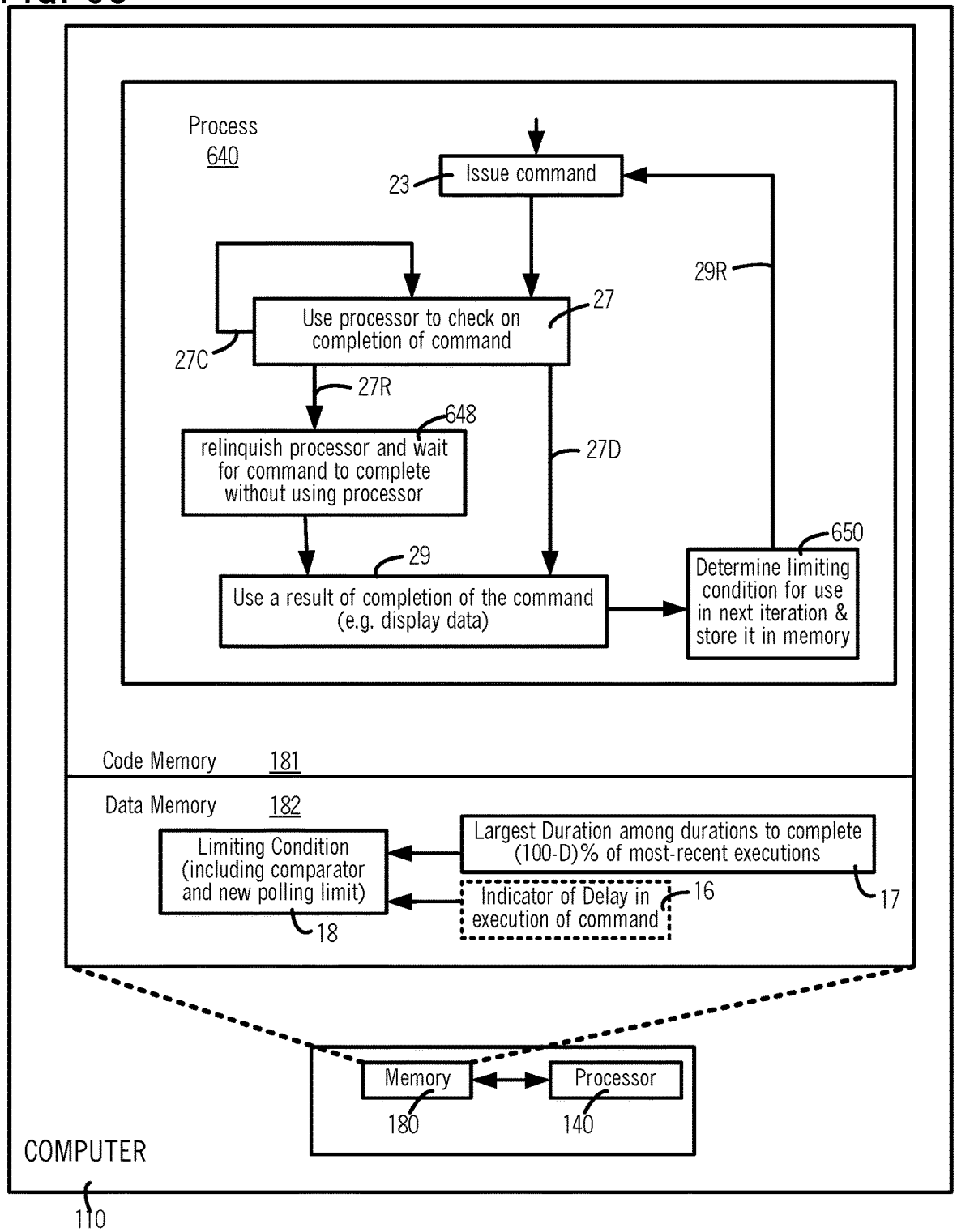
FIG. 6C illustrates computer 110 including a memory 180 that in turn includes a code memory 181 which stores software including instructions to perform steps 23, 27, 648, 29 and 650 of a process 640 in some embodiments.

In some embodiments illustrated in FIG. 6C, after step 29, process 640 uses a duration of execution of the command issued in step 23, to automatically determine and store in memory 180, in step 650, a limiting condition 18 for future use to limit continuous polling during a next execution of the command, which is issued thereafter on process 640 returning via branch 29R to step 23. In certain embodiments, in step 650, process 640 may determine and store in data memory 182, limiting condition 18 based on one or more factors 16 and 17. Factor 17 may be, for example, a largest duration among durations of (100-D)% of a subset of executions ("recent executions") of the command (issued in step 23) which are newly selected relative to a starting time of execution of the command, e.g. which complete within a sliding window of a predetermined length (such as 1 minute) as described herein (e.g. see FIG. 9C).

Factor 16 may be, for example, an indicator 185 of delay in current execution of the command (which was issued in step 23), and such a factor 16 may be used in step 650 (e.g. in combination with other factors) to determine limiting condition 18 in some embodiments. As noted above, on completion of step 650, process 640 of FIG. 6C may perform other steps, and eventually returns to step 23 (described above). Factor 16 need not be used to determine limiting condition 18 in step 650 of FIG. 6C of some embodiments, for example because step 650 may use factor 17 and/or other factors. In certain embodiments of the type illustrated in FIG. 7A and described below, factor 17 (FIG. 6C) is used in step 714 (of FIG. 7A). In alternative embodiments described below, factor 16 (FIG. 6C) is used in step 725 which is performed after step 723 but before step 727 (of FIG. 7B).

Figure 7A:
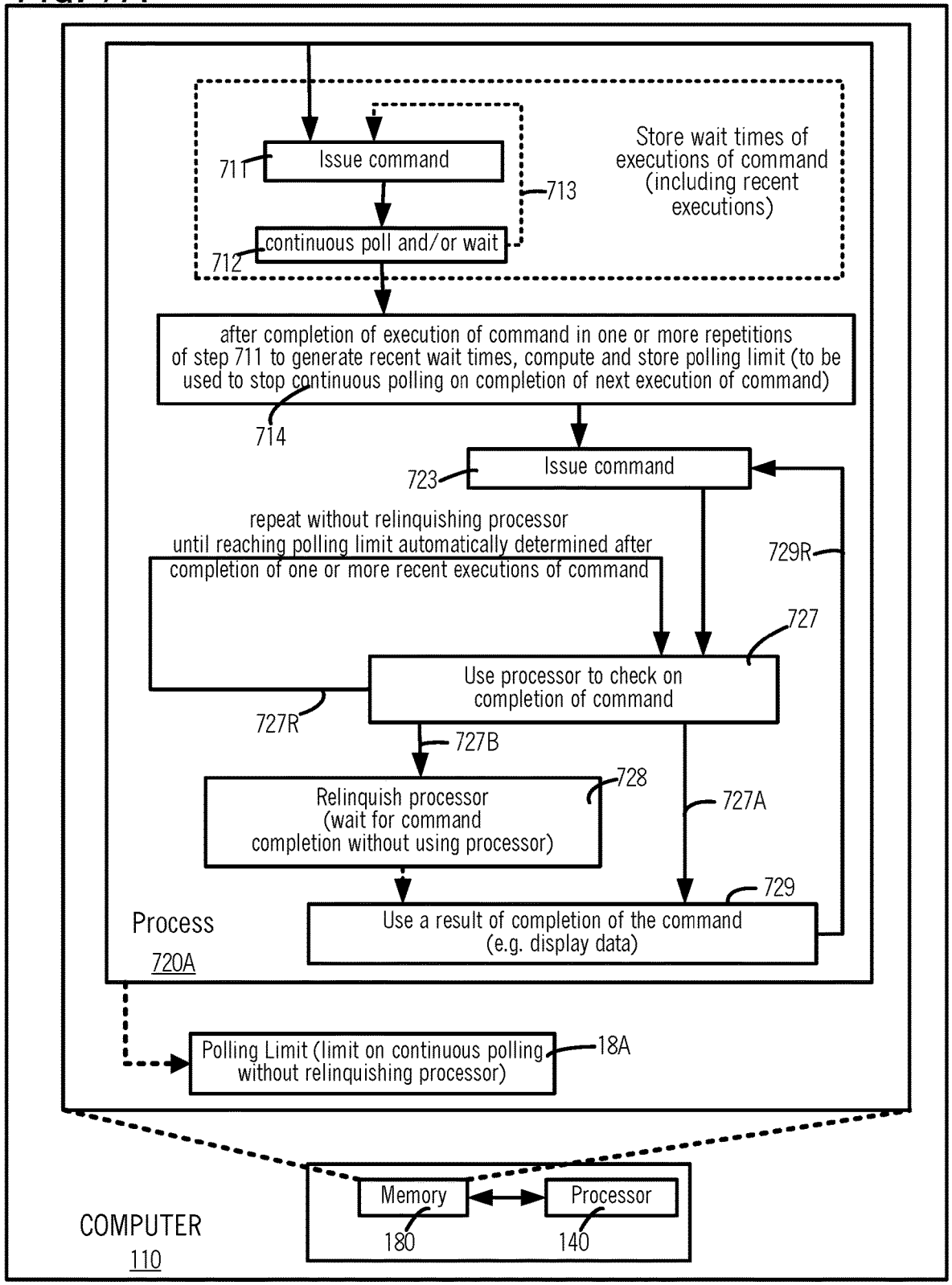
FIGS. 7A and 7B illustrate, in high-level flow charts, steps in processes 720A and 720B to implement two different embodiments of process 640 of FIG. 6C.
Figure 7B:
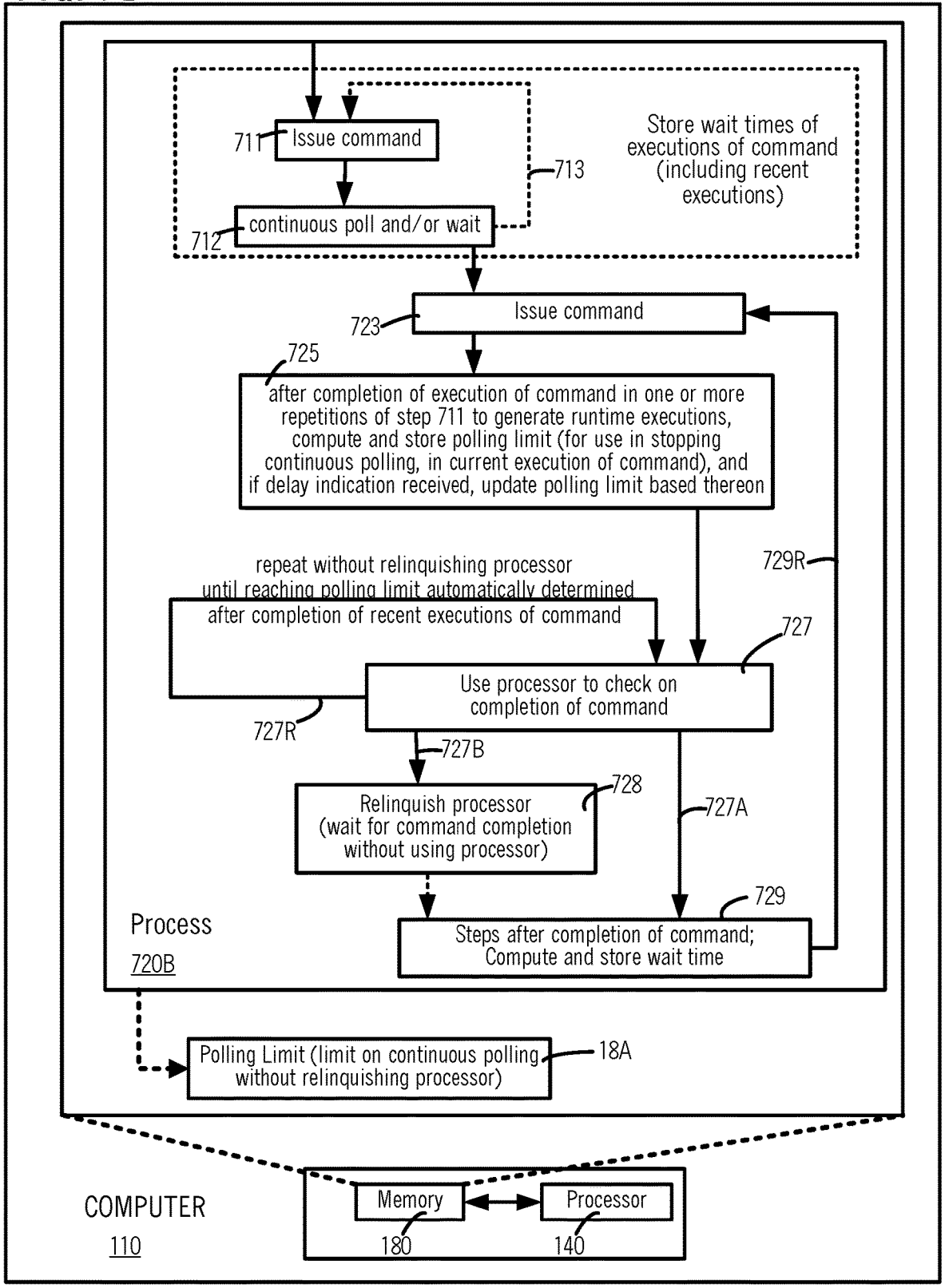

In some embodiments, process 640 of FIG. 6C may be configured to additionally issue the command one or more times prior to step 23. Specifically, process 640 may be configured to perform steps 301-304 as illustrated in FIG. 3A described above, so that the limiting condition 18 (see FIG. 6C) is automatically determined before branch 29R (FIG. 6C) is performed. Specifically, as illustrated in FIGS. 7A and 7B, in some embodiments, respective processes 720A and 720B issue a command in step 711, and thereafter go to step 712. In step 712 (FIGS. 7A and 7B), processes 720A and 720B may perform continuous polling without relinquishing processor 140 to check on completion of execution of the command issued in step 711 and/or wait for the command's completion by relinquishing processor 140. Processes 720A and 720B of FIGS. 7A and 7B may perform the above-described steps 711 and 712 multiple times, as shown by branch 713 (see FIGS. 7A and 7B). Hence, several durations of command execution completions are stored in memory 180, e.g. as described above in reference to arrays in storage locations 184, and 188B-188Y in memory 180 (see FIGS. 9B, 9C, described below).

After completion of step 712, process 720A illustrated in FIG. 7A performs step 714 to compute and store limiting condition 18 (FIG. 6C), e.g. by determining a polling limit 18A (shown in FIG. 7A). In step 714 of FIG. 7A, which is performed after completion of execution of command (in one or more repetitions of steps 711 and 712), process 720A computes and stores polling limit 19 for future use in limiting continuous polling during performance of branch 727R, to check on completion of a next execution of the command (which will be issued on performance of step 723, as described above in reference to FIG. 6C). Subsequently, after completion of execution of the command, which is issued in step 723, process 720A performs step 729 (similar to step 27 shown in FIG. 6C), to compute and store polling limit 19 (FIG. 7A) for use stopping looping via branch 727R (during the next execution of the command).

Process 720B of FIG. 7B is similar to process 720A of FIG. 7A except that after completion of step 712, process 720B of FIG. 7B does not perform step 714 of FIG. 7A, and instead in FIG. 7B the limiting condition 18 is determined and stored in step 725 which is performed between steps 723 and 727 (both steps are similar to corresponding steps 23 and 27 described above, in reference to FIG. 6C). In step 725, process 720B of FIG. 7B may determine limiting condition 18 additionally as described above, by updating polling limit 19 based on an indicator 185 (see FIG. 9C, described below) of delay in completion of execution of the command, e.g. in response to indicator 185 being changed (if locally determined) and/or received (if received from a remote computer), after issuance of the command in step 723.

Accordingly, one or more of processes 20 (FIGS. 1A, 1B), 320 (FIG. 3A), 420 (FIG. 4), 520 (FIG. 5A), 620 (FIG. 6A), 630 (FIG. 6B), 640 (FIG. 6C), 720A (FIG. 7A) and 720B (FIG. 7B) are configured in some embodiments to implement a self-tuning polling/busy waiting technique that can dynamically adapt itself to network and other latencies to minimize OS wait and CPU resource consumption. Therefore, in several embodiments, polling or busy waiting is used by the just-described processes to achieve low latency. Thus, such a process of some embodiments spins till it receives data on network and does not go into OS wait. This enables the process to avoid operating system call overhead and context switches which can introduce unbounded latencies. Note that busy waiting by such a process of some embodiments does consume CPU, while the process is spinning in a loop (e.g. via branch 27R in FIGS. 6, 7A and 7B), which starves other processes from doing productive work. Thus, a process of the type described in this paragraph is configured in some embodiments to self-tune the polling/busy waiting loop to dynamically adapt itself to network and other latencies, to minimize OS wait and CPU resource consumption.

Although in many embodiments of the type described above in reference to FIGS. 1A, 1B, 3A, 4, 5A, 5B, 6A, 6B, 6C, 7A and 7B, polling limit 18A is determined in local computer 110, in other embodiments polling limit 18A may be determined in a process 860 in remote server computer 190 as illustrated in FIG. 8. Specifically, in such embodiments, process 860 (FIG. 8) responds to receipt of a network I/O command 183 by automatically performing step 862 to determine polling limit's value 18A. In performing step 862, process 860 may locally implement one or more of acts 911-914 described below, and a result thereof e.g. based on an indicator 185 (see FIG. 9C below) of delay in current execution of the network I/O command 183 (e.g. described above in reference to step 522B). Thereafter, process 860 (FIG. 8) automatically transmits polling limit's value 18A via I/O controller 150 into a shared area of memory 180 in computer 110. Process 820 of FIG. 8, which issued the network I/O command 183, opens the just-described shared area in memory 180 for read access, and reads one or more values stored therein, thereby to obtain the remotely-generated polling limit 18A. This remotely-generated polling limit 18A may be used by process 820, with or without adjustment, in determining when to continue or stop repeated polling via branch 823R.

In some embodiments, remotely-generated polling limit 18A is transmitted into memory 180 via remote direct memory access (also called "remote DMA"). Remote DMA is performed between memories 180 and 880 of respective computers 110 and 190, via respective network interface modules 150 and 750 that are coupled to one another by a network 170 which includes one or more switches, e.g. a communication switch 175 as described above. In some embodiments, remote DMA is also used by the network I/O command 183 issued in step 821, to automatically transfer data to memory 180 of local computer 110 from remote server computer 190 (which includes memory 880 shown in FIG. 8).

In some embodiments, step 305 of FIG. 3A is similarly implemented by one or more of acts 911-914 illustrated in FIG. 9A, as follows. In act 911 (FIG. 9A), process 320 uses durations of recent executions of the command (which may be issued, e.g. similar to act 303 or act 23 of FIG. 3A as a network I/O command) that complete within a sliding window (e.g. in the most-recent 1 minute), to automatically identify a specific time period (e.g. 12 microseconds) within which complete a specific percentage (e.g. 85%) of recent executions of the command. In support of act 911 (FIG. 9A), process 20 may automatically store in memory 180, information related to durations of a network I/O command 183's execution completions in the sliding window in an array 184 in memory 180 (FIGS. 9B, 9C), e.g. similar to step 304 or in step 330 described above. Executions of network command 183 which complete within such a sliding window of predetermined length are also referred to as recent executions (which form a set of executions used in determination of polling limit 18A). Each element A[i] of the array 184 (FIGS. 9B, 9C) identifies how many of the recent executions of the network I/O command 183 completed in a duration between "i" and "i−1" without process 320 going to sleep (or entering an operating system wait). Hence, each time step 304 or step 330 is performed as described above, process 320 automatically updates the just-described array 184 (FIGS. 9B, 9C).

Accordingly, in act 911 (FIG. 9A), for each value i, process 320 may compare a desired percentage number D with a sum of values of all array elements with indexes 1 to i (all retrieved from memory 180) to automatically identify a smallest value 186 (FIG. 9C) of duration i (e.g. a good value for PL) which yields the largest sum less than or equal to 100-D. Thereafter, in act 912 (FIG. 9A), process 320 compares this smallest i value 186 (FIG. 9C) identified in act 911 (e.g. PL), with upper bound 187 (FIG. 9C), which may be a preset value PLmax. If the identified smallest i value 186 (FIG. 9C) is less than upper bound PLmax value 187 (FIG. 9C), the polling limit's new value 18A (FIG. 9C) is automatically set by process 120 to the identified smallest i value 186 in act 913 (FIG. 9A). But if the identified smallest i value 186 (FIG. 9C) is greater than or equal to upper bound PLmax value 187 (FIG. 9C), the polling limit's new value 18A (FIG. 9C) is automatically set by process 120 to the upper bound PLmax value 187 (FIG. 9C), in act 914 (FIG. 9A).

More specifically, in certain embodiments, "T" denotes a total number of recent executions of the network I/O command 183, and "W" denotes a number of times the polling limit was reached followed by an OS wait (by issuance of a sleep command) before the network I/O command 183 completed execution. Hence, a new value 18A of polling limit PL (FIG. 9C) may be automatically determined as a smallest i value 186 that results in only "D" percent of completions requiring an OS wait (and correspondingly, 100-D percent completions without OS wait), as follows:

$$(W/T)*100<D$$

If "PLmax" denotes an upper bound on the polling limit, to avoid excessive CPU usage:

$$PL<=PLmax$$

Setting such a polling limit's new value 18A includes comparing the smallest i value 186 to the present upper bound PLmax value 187 and storing the smallest i value 186 as the polling limit's new value 18A in response to the smallest i value 186 being found by the comparing to be less than or equal to the preset upper bound PLmax value 187, in some embodiments.

In several embodiments, self tuning may be automatically performed by process 120 when W/T percent is higher than D. Specifically, PL's value 18A is initially set to a preset value, e.g. the PLmax value 187 (FIG. 9C), and in initialization period Pi (FIG. 1D) at least N number of samples are recorded, of durations to perform the network I/O command 183. During this initial stage in period Pi, process 120 automatically maintains in memory 180 (see FIGS. 9B, 9C), an array Δ indexed by "i" which denotes the amount of time spent in polling after issuance of the network I/O command 183 (also referred to as "duration"), with "i" ranging from 1 to PLmax value 187 (FIG. 9C). At any location "i" in the array, the value A(i) denotes a number of non OS waits that resulted in successful receipt of data, when "i" was used as the polling limit to stop continuous polling and enter an OS wait. As N is the total number of samples, $$N = \left(\sum_{i=1}^{PLmax} A(i)\right)$$

Hence, the smallest i value 186 (FIG. 9C) which yields a desired "D" percent of OS waits, is identified (e.g. in step 25 of FIG. 1A) such that:

$$\frac{\left(\sum_{i=1}^{PL} A(i)\right)}{N} *100 \geq (100-D)$$

If the smallest i value 186 identified as shown above is greater than upper bound PLmax, 187 (FIG. 9C), process 20 of some embodiments may automatically switch off polling, by skipping step 27 (FIG. 1A) altogether, or ending step 27 if continuous polling already started. Whenever step 27 is skipped, process 20 may be configured to automatically continue to skip step 27 for a predetermined amount of time (or a predetermined number of issuances of the network I/O command 183).

When a polling limit PL's value 18A does not yield a desired D percent of OS waits (or 100-D percent no-OS wait completions), some embodiments of process 120 may automatically increase the polling limit PL's value 18A by a preset delta (e.g. 1 microsecond), until an increased PL value starts yielding the desired D percent of OS waits. Instead of summing up the A(i) values as noted above, some embodiments of step 25 (FIG. 1A) perform a binary search in the array Δ in memory 180, between current polling limit PL's value 18A and PLmax, to automatically identify a new value of polling limit PL that yields a desired D percent of OS waits.

In some embodiments, remote server computer 190 is coupled to a database 1002 (FIG. 10), which stores data in rows of tables accessible via a relational database management system (RDBMS), such as Oracle Database 11g release 2, available from Oracle Corporation. Hence, one or more processes of the RDBMS in remote server computer (also called "server computer") 190, such as process 1070 (FIG. 10) may retrieve data from database 1002 by supplying thereto, for example, an identifier of a table in a request 1006A, and receive therefrom a response 1006B which includes rows of values in the just-described table. The retrieved row values may be stored by process 1070 in memory 1060 (FIG. 10) of server computer 190. As noted above, memory 1060 of some embodiments is accessible by remote DMA to computer (also called "client computer") 110.

Process 120 in client computer 110 may execute client software that automatically issues, e.g. a query 1004 (FIG. 10) in a structured query language (SQL). The just-described SQL query 1004 may be transmitted from process 120 in client computer 110 to process 1070 in server computer 190, in a network I/O command 183 (as described above) via remote DMA. Moreover, process 1070 may initially provide (e.g. via remote DMA), a delay indication signal 1005A (FIG. 10) from which is extracted and stored in memory 180, an indicator 185 (FIG. 9C) for use by process 120, subsequently followed by transferring results of query execution as data 1005B (also via remote DMA) as responsive to the network I/O command. In addition to responding to queries from client computer 110, server computer 190 may automatically respond to similar SQL queries from other client computers, such as client devices 1010, wherein all these computers may be coupled to each other by communication switch 175, which may be implemented, e.g. as an Ethernet switch.

To support remote DMA from computer 110, a portion of memory 1060 within server computer 190 is made accessible to client computer 110, and client computer 110 writes SQL query 1004 (FIG. 10) into memory 1060 by use of an embedded processor (not shown) in network interface module 1050 without involving any processors 1040-1043 in server computer 190. Similarly, to support remote DMA from server computer 190, a portion of memory 180 within client computer 110 is made accessible to server computer 190, and server computer 190 writes into memory 180 by use of an embedded processor (not shown) in network interface module 150 without involving any processors 140-143 (FIG. 10) in computer 110. Computers 110 and 190 are coupled to one another via a communications switch 175 which implements a network (such as Ethernet).

In some embodiments, server computer 190 (FIG. 10) may execute process 1070 to automatically transfer one or more data blocks from memory 1060 via remote DMA to memory 180 of client computer 110. Specifically, server computer 190 (FIG. 10) may be configured to transfer data to/from client computer 110 by automatically issuing a network I/O command 183 in step 23 (FIG. 1A) and thereafter automatically performing continuous polling in step 27, with a polling limit being automatically determined either before the command-issuance step 23 or after the command-issuance step 23 or both before and after the command-issuance step 23. Hence, in such embodiments, both computers 110 and 190 may perform steps 21-29 illustrated in FIG. 1A, to automatically transfer data in both directions, between one another.

In some embodiments of computers 110, 190, functionality in the above-described one or more steps or acts described above in reference to FIGS. 1A, 1B, 3A, 4, 5A, 5B, 6A, 6B, 6C, 7A and 7B, 8, 9A and 9C may be performed by processors 140-143 (FIG. 10), and processors 1040-1043 executing software in respective memories 180, 1060 respectively, although in other embodiments such functionality is implemented in any combination of hardware circuitry and/or firmware and/or software in computers 110, 190. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing one or more steps or acts described above in reference to FIGS. 1A, 1B, 3A, 4, 5A, 5B, 6A, 6B, 6C, 7A and 7B, 8, 9A and 9C can, but need not necessarily include, one or more microprocessors, embedded processors, controllers, application specific integrated circuits (ASICs), digital signal processors (DSPs), multi-core processors and the like.

Any non-transitory computer readable medium tangibly embodying software (also called "computer instructions") may be used in implementing one or more acts or steps described above in reference to FIGS. 1A, 1B, 3A, 4, 5A, 5B, 6A, 6B, 6C, 7A and 7B, 8, 9A and 9C. Such software may include program codes stored in memory 180, 1060 and executed by processors 140-143, and processors 1040-1043 (FIG. 10). Memory 180, 1060 may be implemented within or external to processors 140-143, and processors 1040-1043, depending on the embodiment. When implemented in firmware and/or software, logic to perform one or more acts or steps described above in reference to FIGS. 1A, 1B, 3A, 4, 5A, 5B, 6A, 6B, 6C, 7A and 7B, 8, 9A and 9C may be stored as one or more computer instructions or code on a non-transitory computer-readable medium.

In some embodiments, computers 110, 190 may include multiple processors 140-143, and processors 1040-1043 (FIG. 10), each of which is programmed with software in memory 180, 1060 shared with each other to perform acts or steps of the type described above. For example, a first processor 141 (FIG. 10) in computer 110 may be programmed with software in memory 180 to implement issuing a network I/O command as described above. A second processor 142 (FIG. 10) in computer 110 may be programmed with software in memory 180 to implement determination of a limiting condition in the form of a delay indicator) as described above, followed by storage of the delay indicator in storage location 185 in memory 180 (FIG. 10), for use by the first processor 141. Thus, two processors 141 and 142 (FIG. 10) have been just described for some embodiments to implement the respective steps, even though shown sequentially in some of FIGS. 1A, 1B, 3A, 4, 5A, 5B, 6A, 6B, 6C, 7A and 7B, 8, 9A and 9C. In some embodiments a single processor 140 is used to implement the steps of FIGS. 1A, 1B, 3A, 4, 5A, 5B, 6A, 6B, 6C, 7A and 7B, 8, 9A and 9C sequentially one after another, without relinquishment of processor 140 as described above. In several embodiments, one processor 140 may be used in a time-shared manner to implement one or more parts of various steps or acts described above so long as processor 140 is not relinquished at any time while performing repeated polling. Furthermore, although processors 141-143 have been described above for certain embodiments as being included in a single computer 110, in other embodiments multiple such processors 141-143 may be included in multiple computers 110, for example two computers may implement two steps of a process, as described herein.

In some embodiments, processes 20 (FIGS. 1A, 1B), 320 (FIG. 3A), 420 (FIG. 4), 520 (FIG. 5A), 620 (FIG. 6A), 630 (FIG. 6B), 640 (FIG. 6C), 720A (FIG. 7A), 720B (FIG. 7B), 820 and 860 (FIG. 8), 1070 and 120 (FIG. 10) are programmed to automatically implement self-tuning network polling with peer feedback. Specifically, such a process implements repeated polling or busy waiting (e.g. in step 27, via branch 27C in FIGS. 1A, 1B) for no more than a time period that is automatically selected to achieve low latency in a majority of situations (e.g. more than 50%), based on durations of recent executions of a specific network I/O command. The busy waiting by such a process automatically spins (e.g. in step 27, via branch 27C in FIGS. 1A, 1B) to repeatedly check on completion of the specific network I/O command, until data is received in response to the specific network I/O command or until a polling limit is reached (e.g. on passage of the automatically-selected time period).

While spinning (e.g. in step 27, via branch 27C in FIGS. 1A, 1B), when a polling limit is reached without receipt of data (e.g. less than or equal to 50% of situations), a process of the type described in the preceding paragraph automatically goes into an OS wait (e.g. wherein the process is put to sleep by the operating system, and subsequently awakened on receipt of data or after a timeout, whichever occurs earlier). In a majority of situations (e.g. more than 50%), data may be received in response to completion of execution of the network I/O command, and hence the process automatically exits the repeated polling (e.g. goes to step 29 via branch 27D in FIG. 1A), which avoids operating system call overhead and context switches (and their related unbounded latencies). While continuous polling for receipt of data, such a process consumes CPU cycles and therefore starves other processes and/or threads from doing productive work (due to their lack of CPU cycles).

Use of a polling limit, which is automatically determined, for a current execution of an externally-executable command, by a processor that issues the command (e.g. in step 23 of FIGS. 1A, 1B) wherein the polling limit is determined to implement OS waits in less than 50% of situations (e.g. based on durations of recent executions of the command), implements a self-tuning polling/busy waiting technique that dynamically adapts itself to network and other latencies, to minimize OS wait and CPU resource consumption. Thus, in several embodiments, a polling limit is not constant, and may be changed by processor 140 even while polling for completion of execution of the command, i.e. the polling limit does not have a fixed value. Thus in such embodiments, a limiting condition based on such a polling limit is not static across multiple executions of a command issued by a process (or thread), and instead changes dynamically in response to one or more changes external to the processor which issued the command, e.g., due to network latency and/or processor load in local and/or remote computers, as noted above.

In certain embodiments of a process of the type described above (e.g. process 20) when a limiting condition is met while repeatedly checking for completion of a command, the process may relinquish its use of a processor by issuing a sleep command, at least by specifying a sleep time period after which the process or thread is to be awakened. In such embodiments, the sleep time period may be specified in addition to an interrupt to be awakened on completion of the command. Hence, in some embodiments, when the command completes, instead of waiting for the sleep time period to end, the operating system may immediately move process (or thread) 20, 120 from the not-runnable queue to the runnable queue.

Thus, while waiting in the runnable queue, when a newly allocated time slice starts (and as noted above, it may start after s delay inherent in context switching), several embodiments of a process of the type described above (e.g. process 20) check whether the current execution of the command has completed. The just-described check is performed in such embodiments, so that the process can identify which of the following two events caused it to be awakened: (a) awakened due to command completion, or (b) awakened due to completion of the sleep time period. If the event identified is (b) awakened due to completion of the sleep time period, then the process may issue the sleep command once again, to wait further in the not-runnable queue.

Depending on the embodiment, either or both of computers 110 and 190, which perform one or more acts or steps described above in reference to FIGS. 1A, 1B, 3A, 4, 5A, 5B, 6A, 6B, 6C, 7A and 7B, 8, 9A and 9C, may be implemented in a system 1000, described below as a "cloud". Cloud 1000 (FIG. 10) of some embodiments includes a pool of resources including, for example, a relational database management system (RDBMS) executing in one or more processors 1040-1043 of server computer 190. Examples of additional resources 1030 which may be included in the pool are processor, server, data storage, virtual machine (VM), platform, and/or other software applications. The pool of resources in cloud 1000 may be geographically centralized and/or distributed. As an example, the pool of resources in cloud 1000 may be located at one or more datacenters.

Client devices 1010 outside cloud 1000 may independently request resources in the form of computing services, such as CPU time (e.g. in processors 140-143 in computer 110) and storage (e.g. in disks 1002A-1002C used by database 1002 in server computer 190), as needed. The just-described resources 140-143, 1002 and additional resources 1030 may be dynamically assigned by server computer 190 to the requests and/or client devices 1010 on an on-demand basis. One or more resources 140-143, 1002, 1030 which are assigned to each particular client device 1010 may be scaled up or down based on the services requested by the particular client device. The resources 140-143, 1002, 1030 assigned to each particular client device 810 may also be scaled up or down based on the aggregated demand for computing services requested by all client devices 1010. In an embodiment, the resources 140-143, 1002, 1030 included in cloud 1000 are accessible via switch 175 over a network 1020, such as a private network or the Internet. One or more physical and/or virtual client devices 1010 demanding use of the resources 140-143, 1002, 1030 may be local to or remote from cloud 1000. The client devices 1010 may be any type of computing devices, such as computers or smartphones, executing any type of operating system. The client devices 1010 communicate requests to access the resources 140-143, 1002, 1030 in cloud 1000 using a communications protocol, such as Hypertext Transfer Protocol (HTTP). Such requests, which are communicated by client devices 1010 via network 1020 to the resources 140-143, 1002, 1030, may be expressed in conformance with an interface, such as a client interface (e.g. a web browser), a program interface, or an application programming interface (API).

In some embodiments, a cloud service provider provides access to cloud 1000 to one or more client devices 1010. Various service models may be implemented by cloud 1000 including but not limited to Software-as-aService (SaaS), Platform-as-a-Service (PaaS), and Infrastructure-as-a-Service (IaaS). In SaaS, a cloud service provider provides client devices 1010 the capability to use the cloud service provider's applications, which are executing on the resources in cloud 1000. Thus, processing, storage, networks, and other resources 140-143, 1002, 1030 of server computer 190 may be made available to client devices 1010, in the form of SaaS. In PaaS, the cloud service provider provides cloud users the capability to deploy onto cloud resources 140-143, 1002, 1030 custom applications, which are created using programming languages, libraries, services, and tools supported by the cloud service provider. In Paas, the cloud service provider may make available to client devices 1010, one or more applications in server computer 190 (described above), such as a Relational Database Management System (RDBMS) as a service, Customer Relationship Management (CRM) application as a service, Enterprise Resource Planning (ERP) as a service, and Java as a service.

In IaaS, the cloud service provider provides cloud users the capability to provision processing, storage, networks, and other resources 140-143, 1002, 1030 in the cloud 1000. Any applications and/or operating systems, in server computer 190 (described above) may be deployed on the resources 140-143, 1002, 1030. Resources 140-143, 1002, 1030 may be used to implement processes to perform one or more acts or steps or operations described above in reference to FIGS. 1A, 1B, 3A, 4, 5A, 5B, 6A, 6B, 6C, 7A and 7B, 8, 9A and 9C, such as processes 20 (FIGS. 1A, 1B), 320 (FIG. 3A), 420 (FIG. 4), 520 (FIG. 5A), 620 (FIG. 6A), 630 (FIG. 6B), 640 (FIG. 6C), 720A (FIG. 7A), 720B (FIG. 7B), 820 and 860 (FIG. 8), 1070 and 120 (FIG. 10).

In some embodiment, various deployment models may be implemented by cloud 800, including but not limited to a private cloud, a public cloud, and a hybrid cloud. In a private cloud, cloud resources 140-143, 1002, 1030 are provisioned for exclusive use by a particular group of one or more users, referred to below as entities, examples of which are a corporation, an organization, a single person, a family, or other such groups of users. The cloud resources may be located on the premises of one or more entities in the particular group, and/or at one or more remote off-premise locations. In a public cloud, cloud resources are provisioned for use by multiple entities (also referred to herein as "tenants" or "customers"). Each tenant uses one or more client devices 1010 to access cloud resources 140-143, 1002, 1030. Several tenants may share their use of a particular resource, such as server computer 190 in cloud 1000 at different times and/or at the same time. Cloud resources 140-143, 1002, 1030 may be located at one or more remote off-premise locations, away from the premises of the tenants.

In some embodiments referred to as hybrid cloud, cloud 1000 includes a private cloud (not shown) and a public cloud (not shown). A cloud interface (not shown) between the private cloud and the public cloud allows for data and application portability. Data stored at the private cloud and data stored at the public cloud may be exchanged through the cloud interface. Applications implemented at the private cloud and applications implemented at the public cloud may have dependencies on each other. A call from an application at the private cloud to an application at the public cloud (and vice versa) may be executed through the cloud interface.

In certain embodiments, cloud 1000 is configured to support multiple tenants such that each tenant is independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In various embodiments, tenant isolation is implemented in cloud 1000. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In several embodiments of cloud 1000, data sets corresponding to various tenants are stored as entries in a database 1002. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In a few embodiment of cloud 1000, data sets and virtual resources (e.g., virtual machines, application instances, and threads) corresponding to different tenants are isolated to tenant-specific overlay networks, which are maintained by cloud 1000. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint de-capsulates the outer packet to obtain the original packet transmitted by the source device. The original packet is transmitted from the second encapsulation tunnel endpoint to the destination device in the same particular overlay network.

Figure 11B:
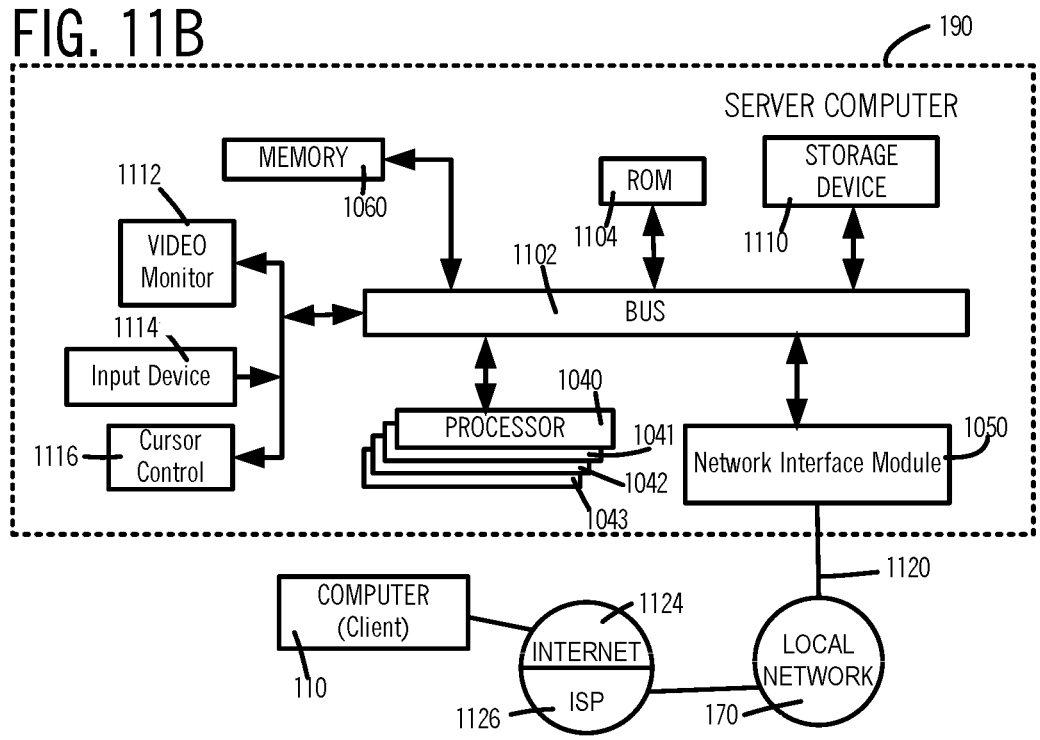

One or more of steps and acts described above in reference to FIGS. 1A, 1B, 3A, 4, 5A, 5B, 6A, 6B, 6C, 7A and 7B, 8, 9A and 9C may be used to program one or more computer(s) 110, 190 each of which may be implemented in hardware of the type illustrated in FIGS. 11A and 11B. Each of computers 110, 190 include a bus 1102 (FIGS. 11A, 11B) or other communication mechanism for communicating information. Computer 110 may include processors 140-143 (FIG. 11A), and computer 190 may include processors 1040-1043 (FIG. 11B). Bus 1102 (FIGS. 11A, 11B) connects processors 140-143, and processors 840-843 respectively to memory 190 and memory 780. Memory 190, 780 may be implemented, for example, as random access memory (RAM) or other dynamic storage device, coupled to bus 1102 for storing information and instructions (e.g. to perform the steps and acts described above in reference to FIGS. 1A, 1B, 3A, 4, 5A, 5B, 6A, 6B, 6C, 7A and 7B, 8, 9A and 9C) to be executed by processors 140-143, and processors 840-843. Memory 190, 780 (FIGS. 11A, 11B) may be used additionally for storing temporary variables or other intermediate information during execution of instructions to be executed by processors 140-143, and processors 840-843.

Computers 110, 190 (FIG. 11A, 11B) may include read only memory (ROM) 1104 or other static storage device coupled to bus 1102 for storing static information and instructions for processors 140-143, and processors 1040-1043 respectively, such as software in the form of relational database management system (RDBMS) software. A storage device 1110, such as a magnetic disk or optical disk may be included in computers 110, 190 and coupled to bus 1002 for storing information and instructions.

Computers 110, 190 may include a display device or video monitor 1112 such as a cathode ray tube (CRT) or a liquid crystal display (LCD) which is coupled to bus 1102 for use in displaying information to a computer user. Computers 110, 190 may include an input device 1114, including alphanumeric and other keys (e.g. of a keyboard) also coupled to bus 1102 for communicating information (such as user input) to processors 140-143, and processors 1040-1043. Another type of user input device is cursor control 1116, such as a mouse, a trackball, or cursor direction keys for communicating information and command selections to processors 140-143, and processors 1040-1043 and for controlling cursor movement on display device 1112. This input device typically has two degrees of freedom in two axes, a first axis (e.g., x) and a second axis (e.g., y), that allows the input device to specify positions in a plane.

As described above, duration of continuous polling without processor relinquishment may be limited in a tunable manner, for each issuance of a command to input and/or output data from/to a network (also called "network command" or "network I/O command") by processors 140-143, and processors 1040-1043 executing one or more sequences of one or more instructions that are contained in memory 180 and memory 1060 respectively. Such instructions may be read into memory 180, 1060 from another non-transitory computer-readable storage medium, such as storage device 1110. Execution of the sequences of instructions contained in main memory 180, 1060 causes respective processors 140-143, and processors 1040-1043 to perform the steps, acts, operations of one or more of processes 20 (FIGS. 1A, 1B), 320 (FIG. 3A), 420 (FIG. 4), 520 (FIG. 5A), 620 (FIG. 6A), 630 (FIG. 6B), 640 (FIG. 6C), 720A (FIG. 7A), 720B (FIG. 7B), 820 and 860 (FIG. 8), 1070 and 120 (FIG. 10). In alternative embodiments, hard-wired circuitry may be used in place of or in combination with software instructions.

The term "non-transitory computer-readable storage medium" as used herein refers to any non-transitory storage medium that participates in providing instructions to processors 140-143, and processors 1040-1043 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computers 110, 190. Volatile storage media includes dynamic memory, such as memory 180, 780 which may be implemented in the form of a random access memory or RAM.

Instructions to processors 140-143 and processors 1040-1043 can be provided by a transmission link or by a non-transitory storage medium from which a computer can read information, such as data and/or code. Specifically, various forms of transmission link and/or non-transitory storage medium may be involved in providing one or more sequences of one or more instructions to processors 140-143, and processors 1040-1043 for execution. For example, the instructions may initially be comprised in a non-transitory storage device, such as a magnetic disk, of a computer. Such a computer can load the instructions into its dynamic memory (RAM) and send the instructions over a telephone line using a modem.

A modem local to computers 110, 190 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to memory 180, 1060, from which processors 140-143, and processors 1040-1043 retrieve and execute the instructions. The instructions received by memory 180, 1060 may optionally be stored on storage device 1110 either before or after execution by processors 140-143, and processors 1040-1043.

Computers 110, 190 include respective network interface modules 150, 1050 coupled to bus 1102. Network interface modules 150, 1050 provides two-way data communication coupling to network link 1120 that is connected to a network 170. Network 170 may interconnect multiple computers (as described above). For example, network interface module 150, 1050 may be an integrated services digital network (ISDN) card or a modem to provide a data communication connection to a corresponding type of telephone line. As another example, network interface module 150, 1050 may be a local area network (LAN) card to provide a data communication connection to a compatible LAN. Wireless links may also be implemented. In any such implementation, network interface module 150, 1050 sends and receives electrical, electromagnetic or optical signals that carry digital data streams representing various types of information.

Network link 1120 typically provides data communication through one or more networks to other data devices. For example, network link 1120 may provide a connection through network 170 to data equipment operated by an Internet Service Provider (ISP) 1126. ISP 1126 in turn provides data communication services through the world wide packet data communication network 1124 now commonly referred to as the "Internet". Network 170 and network 1124 both use electrical, electromagnetic or optical signals that carry digital data streams. The signals through the various networks and the signals on network link 1120 and through network interface module 150, 1050, which carry the digital data to and from computers 110, 190, are exemplary forms of carrier waves transporting the information.

Computers 110, 190 can send messages and receive data, including program code, through the network(s), network link 1120 and network interface module 150, 1050. In the Internet example, a server computer 190 might transmit information retrieved from RDBMS database through Internet 1124, ISP 1126, network 170 and network interface module 150, 1050. Computer instructions for performing one or more steps or acts described above in reference to FIGS. 1A, 1B, 3A, 4, 5A, 5B, 6A, 6B, 6C, 7A and 7B, 8, 9A and 9C may be executed by processors 140-143, and processors 1040-1043 as they are received, and/or stored in storage device 1110, or other non-volatile storage for later execution. In this manner, computers 110, 190 may additionally or alternatively obtain instructions and any related data in the form of a carrier wave.

Note that FIGS. 11A and 11B are low-level representations of some hardware components of computers 110, 190. Several embodiments have additional software components and/or related data in memory 180, 1060, as shown in FIGS. 6B and 6C. In addition to memory 180, 1060, computers 110, 190 may include one or more other types of memory such as flash memory (or SD card) and/or a hard disk and/or an optical disk (also called "secondary memory") to store data and/or software for loading into memory 110, 1060 (also called "main memory") and/or for use by processors 140-143, and processors 1040-1043. In some embodiments, server computer 190 implements a relational database management system to manage data in one or more tables of a relational database 1002 of the type illustrated in FIG. 10. Such a relational database management system may manage a distributed database that includes multiple databases, and tables may be stored on different storage mechanisms.

In some embodiments, processors 1040-1043 that execute software of a relational database management system can access and modify the data in a relational database 1002, and hence server computer 190 accepts queries in conformance with a relational database language, the most common of which is the Structured Query Language (SQL). The commands are used by processors 1040-1043 of some embodiments to store, modify and retrieve data about an application program in the form of rows in a table in relational database 1002. Client computer 110 may include output logic that makes the data in a database table retrieved from database 1002 via server computer 190, available to a user via a graphical user interface that generates a screen of an application program on a video monitor 1112. In one example, the output logic of client computer 110 provides results on a monitor or other such visual display, via a command line interface. Additionally and/or alternatively, screens responsive to a command in a command-line interface and display on a video monitor may be generated by server computer 190.

Numerous modifications and adaptations of the embodiments described herein will become apparent to the skilled artisan in view of this disclosure. Numerous modifications and adaptations of the embodiments described herein are encompassed by the attached claims.

The invention claimed is:

1. A method of implementing a process or thread in a computer, the method comprising:
  issuing a command to be executed without use of a processor allocated to the thread or process, wherein the thread or process retains control of the processor after issuance of the command;
  determining a limit to stop repetitive checking on completion of the command based at least partially on metrics of multiple recent executions identified programmatically by use of a sliding window that after being moved forward omits one or more of the multiple recent executions;
  checking, by using the processor allocated to the thread or process, on whether a current execution of the command has completed, and while the current execution of the command has not completed, without relinquishing the processor allocated to the thread or process, repeating the checking until the limit is reached; and
  relinquishing the processor allocated to the thread or process, in response to the limit being reached.

2. The method of claim 1 wherein:
  the metrics comprise wait times of the multiple recent executions and the multiple recent executions are started after the thread or process starts running.

3. The method of claim 1 wherein the command to start the current execution is issued in a specific connection and the command is identified by a specific name, the method further comprising, prior to the issuing:
  setting up the specific connection between said computer and a specific storage; and
  repeatedly issuing the command identified by the specific name with different arguments, to start the multiple recent executions in the specific connection.

4. The method of claim 1 wherein:
  the sliding window has a fixed size and the sliding window is moved forward at least after completion of each of the multiple recent executions.

5. The method of claim 1 wherein:
  the determining comprises ascertaining a smallest duration such that at least a fixed percent of the multiple recent executions complete within the smallest duration; and
  wherein the limit is based at least partially on the smallest duration.

6. The method of claim 5 wherein:
  the determining further comprises comparing the smallest duration to a preset upper bound; and
  the method further comprises storing in a memory coupled to the processor, the smallest duration as the limit, in response to the smallest duration being found by the comparing to be less than or equal to the preset upper bound.

7. The method of claim 1 wherein the command is identified by a specific name and wherein:
  each execution among the multiple recent executions is started by issuing the command identified by the specific name; and
  to start at least one execution among the multiple recent executions, the command identified by the specific name is issued with one or more arguments different from corresponding one or more arguments with which the command identified by the specific name is issued to start at least another execution among the multiple recent executions.

8. The method of claim 1 wherein:
  the limit is determined based at least partially on an indicator of current status external to the processor.

9. The method of claim 8 wherein:
  the indicator of current status is received in said computer, from a remote computer.

10. The method of claim 1 wherein the relinquishing comprises:
  issuing a sleep command specifying at least a sleep time period after which the process or thread is to be awakened.

11. The method of claim 1 further comprising:
  using a result of the command, in response to finding by the checking that the command has completed.

12. The method of claim 1 further comprising after completion of the command:
  computing a current wait time, as a time difference between a time of completion of the command and a time of starting the command; and
  determining a newer limit to be imposed on repetitive checking for completion of the command when issued next, based at least partially on the current wait time.

13. The method of claim 1 wherein the command is identified by a specific name, the method further comprising:
  using any processor to issue the command identified by the specific name an additional time with arguments different from arguments with which the command identified by the specific name is issued in the current execution and retaining control of said any processor after issuance of the command the additional time;
  determining a newer limit to be imposed on repetitive checking for completion of the command issued the additional time based at least partially on metrics of one or more additional executions identified by the sliding window after being moved forward;

checking by using said any processor, on whether a newer execution that starts in response to issuance of the command the additional time has completed, and while the newer execution has not completed, without relinquishing said any processor, repeating the checking on whether the newer execution has completed until the newer limit is reached; and relinquishing said any processor in response to the newer limit being reached.

14. One or more non-transitory computer-readable storage media storing a plurality of instructions that when executed by one or more processors in a computer cause the one or more processors to:

issue a command to be executed without use of a processor allocated to the thread or process, wherein the thread or process retains control of the processor after issuance of the command;

determine a limit to be imposed on repetitive checking on completion of the command based at least partially on metrics of multiple recent executions identified programmatically by use of a sliding window that after being moved forward omits one or more of the multiple recent executions;

check by using the processor allocated to the thread or process, on whether a current execution of the command has completed, and while the current execution of the command has not completed, without relinquishing the processor allocated to the thread or process, repeating the checking until the limit is reached; and relinquish the processor allocated to the thread or process, in response to the limit being reached.

15. The one or more non-transitory computer-readable storage media of claim 14 wherein:

the metrics comprise wait times of the multiple recent executions and the multiple recent executions are started after the thread or process starts running.

16. The one or more non-transitory computer-readable storage media of claim 14 wherein the plurality of instructions when executed by the one or more processors further cause the one or more processors to:

the sliding window has a fixed size and the sliding window is moved forward at least after completion of each of the multiple recent executions.

17. The one or more non-transitory computer-readable storage media of claim 14 wherein:

the limit is determined based at least partially on an indicator of state in the current execution of the command.

18. The one or more non-transitory computer-readable storage media of claim 14 wherein the processor is relinquished at least by:

issuance of a sleep command specifying at least a sleep time period after which the process or thread is to be awakened.

19. The one or more non-transitory computer-readable storage media of claim 14 wherein the plurality of instructions when executed by the one or more processors further cause the one or more processors to, after completion of the current execution of the command:

compute a current wait time of the current execution of the command, as a time difference between a time of completion of the current execution of the command and a time of starting of the current execution of the command; and determine a newer limit to be imposed on repetitive checking for completion of the command, based at least partially on the current wait time of the current execution of the command.

20. An apparatus comprising one or more computer memories coupled to one or more processors in a computer, the one or more processors being configured to execute instructions in the one or more computer memories to cause:

issuing a command to be executed without use of a processor allocated to the thread or process, wherein the thread or process retains control of the processor after issuance of the command;

determining a limit to be imposed on repetitive checking on completion of the command based at least partially on metrics of multiple recent executions identified programmatically by use of a sliding window that after being moved forward omits one or more of the multiple recent executions;

checking by use of the processor allocated to the thread or process, on whether a current execution of the command has completed, and while the current execution of the command has not completed, without relinquishing the processor allocated to the thread or process, repeating the checking until the limit is reached; and relinquishing the processor allocated to the thread or process, in response to the limit being reached.

21. The method of claim 5 wherein:

the determining further comprises comparing the smallest duration to a preset upper bound; and the method further comprises storing the preset upper bound as the limit, at least in response to the smallest duration being found by the comparing to be at least one of greater than or equal to the preset upper bound.

22. The method of claim 1 wherein:

multiple commands are issued over multiple connections to start the multiple recent executions.

23. The method of claim 1 wherein:

to start at least one execution among the multiple recent executions, the command is issued with one or more arguments different from arguments of the command in the current execution.

* * * * *

UNITED STATES PATENT AND TRADEMARK OFFICE
CERTIFICATE OF CORRECTION

PATENT NO. : 11,036,542 B2  
APPLICATION NO. : 16/052473  
DATED : June 15, 2021  
INVENTOR(S) : Mathur et al.

Page 1 of 1

It is certified that error appears in the above-identified patent and that said Letters Patent is hereby corrected as shown below:

In the Specification

In Column 1, Line 14, delete "Δ" and insert -- A --, therefor.

In Column 1, Line 20, delete "Δ" and insert -- A --, therefor.

In Column 1, Line 21, delete "Δ" and insert -- A --, therefor.

In Column 5, Line 24, delete "527A,527B," and insert -- 527A, 527B, --, therefor.

In Column 12, Line 14, delete "2031," and insert -- 203I, --, therefor.

In Column 12, Line 43, delete "2031" and insert -- 203I --, therefor.

In Column 13, Line 18, delete "2A). is" and insert -- 2A) is --, therefor.

In Column 21, Line 53, delete "Δ" and insert -- A --, therefor.

In Column 21, Line 55, delete "Δ" and insert -- A --, therefor.

In Column 25, Line 67, delete "present" and insert -- preset --, therefor.

In Column 26, Line 14, delete "Δ" and insert -- A --, therefor.

In Column 26, Line 55, delete "Δ" and insert -- A --, therefor.

In Column 30, Line 55, delete "aService" and insert -- a-Service --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*